(12) United States Patent
Ide et al.

(10) Patent No.: US 7,252,356 B2
(45) Date of Patent: Aug. 7, 2007

(54) RECORDING APPARATUS AND METHOD

(75) Inventors: Daisaku Ide, Meguro-ku (JP); Hitoshi Nishikori, Inagi (JP); Takeshi Yazawa, Yokohama (JP); Atsuhiko Masuyama, Shinagawa-ku (JP); Akiko Maru, Kawasaki (JP); Satoshi Seki, Kawasaki (JP); Hirokazu Yoshikawa, Kawasaki (JP); Hideaki Takamiya, Kawasaki (JP); Kosuke Yamamoto, Yokohama (JP); Hiroshi Tajika, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 11/210,493

(22) Filed: Aug. 24, 2005

(65) Prior Publication Data
US 2006/0044574 A1 Mar. 2, 2006

(30) Foreign Application Priority Data
Aug. 30, 2004 (JP) .............................. 2004-251078

(51) Int. Cl.
*B41J 2/15* (2006.01)
(52) U.S. Cl. .......................................... 347/12; 347/41
(58) Field of Classification Search .................. 347/12, 347/41, 16, 15
See application file for complete search history.

(56) References Cited

U.S. PATENT DOCUMENTS 6,375,307 B1 * 4/2002 Vinals et al. ................. 347/41
6,942,310 B2 * 9/2005 Kanda et al. ................. 347/15

FOREIGN PATENT DOCUMENTS

| JP | 11-291506 | 10/1999 |
|----|-----------|---------|
| JP | 2002-096455 | 4/2002 |
| JP | 2002-144522 | 5/2002 |
| JP | 2004-98668 | 7/2003 |

* cited by examiner

Primary Examiner—Lamson Nguyen

(57) ABSTRACT

A recording apparatus is configured to record an image on a recording medium by repeating a recording operation and a conveying operation. The recording operation is operative to apply a recording agent to the recording medium using a recording head while moving the recording head for scanning in a direction different from a predetermined direction. The recording head includes a plurality of recording elements arranged in the predetermined direction and adapted to apply the recording agent. The conveying operation is operative to convey the recording medium in a direction transverse to the scanning direction. The recording apparatus includes a recording control unit configured to perform the recording operation such that a number of the recording elements which are used to record an image on at least one of a front end portion and a rear end portion of the recording medium is reduced at a rate as compared to that of the recording elements which are used to record an image on a central portion of the recording medium, and a recording mode selecting unit configured to select a recording mode from a plurality of recording modes differing from one another in at least one of recording quality and recording time. The recording control unit changes the rate of reduction according to the recording mode selected by the recording mode selecting unit.

11 Claims, 34 Drawing Sheets

FIG.8

| MASK PATTERN | a | b | c | d | e |
|---|---|---|---|---|---|
| END-PORTION RECORDING-RATE RATIO | 0.6 | 0.5 | 0.4 | 0.3 | 0.2 |
| RECORDING RATE AT END PORTION | 15 | 12.5 | 10 | 7.5 | 5 |
| RECORDING RATE AT CENTRAL PORTION | 35 | 37.5 | 40 | 42.5 | 45 |

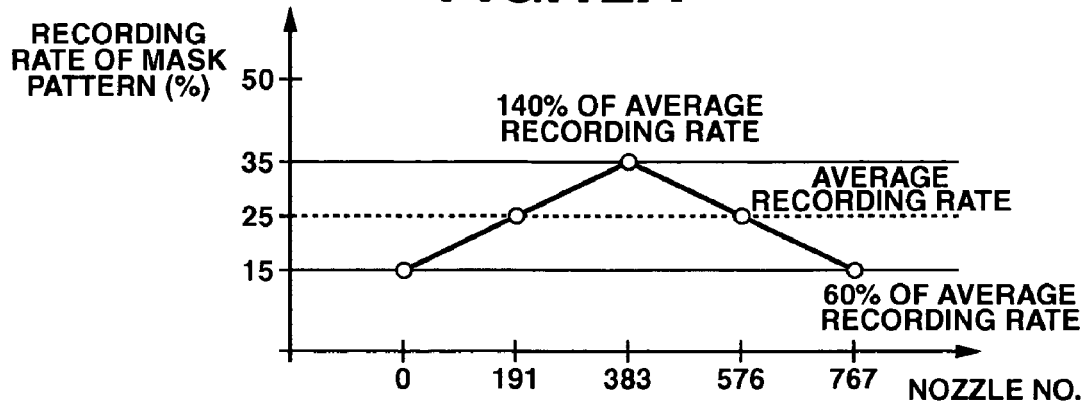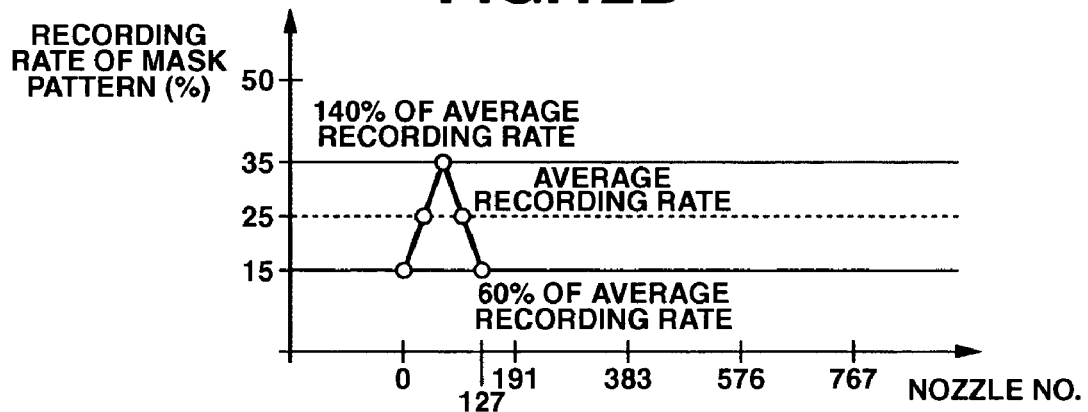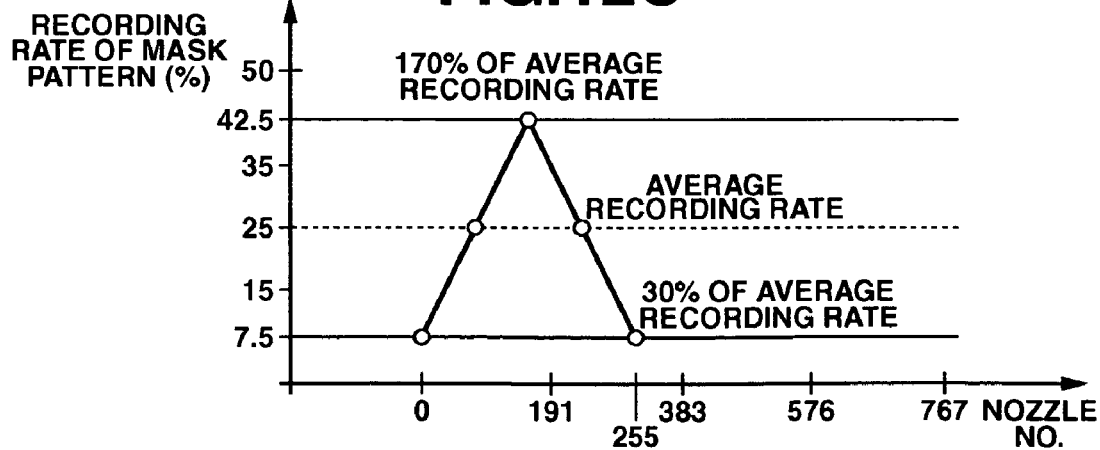

FIG.28

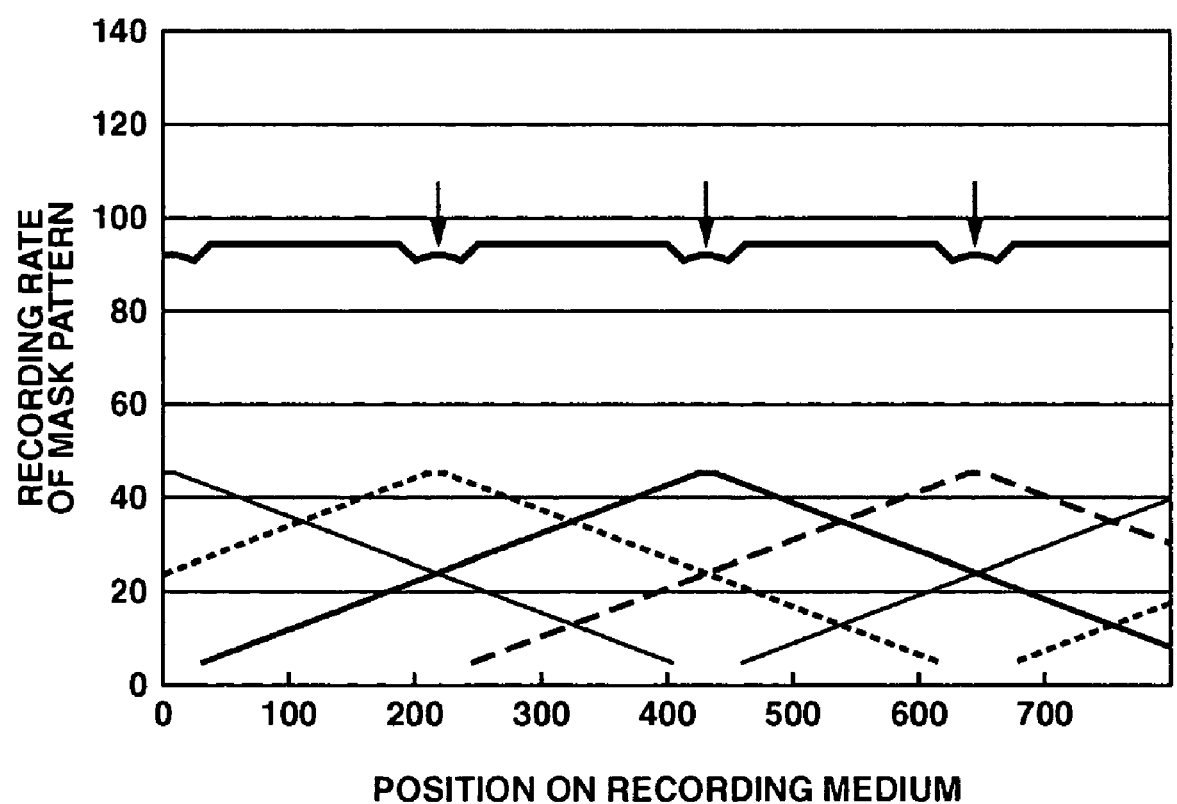

RECORDING APPARATUS AND METHOD

BACKGROUND OF THE INVENTION

1. Field of the Invention

The present invention relates to a recording apparatus and method configured to record an image by applying a recording agent to a recording medium.

2. Description of the Related Art

Recently, OA apparatuses, such as personal computers and word processors, have been in widespread use. Various recording apparatuses configured to record information, which is outputted from the OA apparatuses, onto various recording media have been provided. Especially, inkjet recording apparatuses have gained widespread acceptance by users due to various advantages, such as low noise, low running cost, compact size, and relative ease of colorization. There have been recently increased demands for outputting images, which are taken by digital cameras, with quality as high as that of silver-halide photographs. To fulfill the demands, diverse recording methods employing various ingenuities have been implemented. For example, at a front or rear end portion of a recording medium, accuracy in conveying a recording medium tends to be reduced due to the structures of recording apparatuses. To address this problem, some inkjet recording apparatuses have already been provided, which employ special recording methods to record images on front or rear end portion of a recording medium.

Hereinafter, practical problems relating to the "recording of an image on a front or rear end portion" are briefly described.

Regarding recording of an image on a front or rear end portion, an image is liable to be distorted when the image is recorded on the front end portion or the rear end portion of a recording medium. A major cause of this tendency is that the recording medium comes off a part of pairs of rollers, which support the recording medium from both upstream and downstream sides thereof and convey the recording medium. This state is described in detail hereinbelow with reference to the accompanying drawings.

FIG. 1 is a schematic view illustrating a recording head, which records an image on a central portion of a recording medium, and a conveying mechanism that conveys the recording medium P while supporting the recording medium P. As shown in FIG. 1, a conveying roller M3060 and two paper discharge rollers M3100 and M3110 are opposed to and are engaged with a pinch roller M3070, and spurs M3120, respectively, to thereby form three nip units that stretch and support the recording medium P. The three pairs of the rollers rotate to thereby enable conveyance of the recording medium P in a direction indicated by an arrow shown in FIG. 1.

Reference character H1000 designates ahead cartridge, in which a plurality of recording elements (or nozzles) operative to discharge ink is arranged at predetermined pitches in the conveying direction shown in FIG. 1. Ink is discharged from each of the recording elements while the head cartridge H1000 scans in a front-to-back direction perpendicular to the plane of the drawing of FIG. 1. Thus, an image is formed on an area of the recording medium P, which is placed between the conveying roller M3060 and the discharge roller M3100. Such a recording scanning operation by the head cartridge H1000, and an operation of conveying the recording medium P by the three pairs of the rollers are alternately repeated, so that images are sequentially formed on the recording medium P.

FIG. 2 shows a state in which the recording of images is progressed from a state shown in FIG. 1 and in which the recording of images is being performed on the vicinity of a rear end portion of the recording medium P. The recording medium P has already come off the conveying roller M3060 and is conveyed only by the rotation of the discharge rollers M3100 and M3110.

Meanwhile, generally, it is frequent that the differences in the main roles among the conveying roller M3060 and the discharge rollers M3100 and M3110 cause the slight differences in roller-diameter and conveying-accuracy thereamong. The major role of the conveying roller M3060 is to position the recording medium at an appropriate place with respect to the recording head in each recording scan. Thus, the conveying roller M3060 has a sufficient roller diameter and can perform the conveying operation with desired accuracy. On the other hand, the major role of each of the discharge rollers M3100 and M3110 is to reliably discharge the recorded recording medium. Thus, usually, the discharge rollers M3100 and 3110 are smaller in roller-diameter than and are inferior in accuracy of conveying the recording medium to the conveying roller M3060. That is, the accuracy in conveying an area to be conveyed between a moment at which the rear end portion of the recording medium P comes off the conveying roller M3060 and a moment at which the recording of an image on the rearmost end of the recording medium P is terminated is reduced as compared with the accuracy in conveying precedent areas of the recording medium P. At that time, in some recorded images, black streaks are confirmed in a case where an amount of the conveyed area is in sufficient. Conversely, white streaks are confirmed in a case where the amount of the conveyed area is too large. Thus, there is a fear that the streaks may be non-negligible deterioration of image quality.

Also, deterioration of image quality is caused due to the fact that both end portions of the recording medium are not held. When the rear end portion of the recording medium P comes off the conveying roller M3060, the distance (hereunder referred to as "a head-paper distance") between the recording head and the recording medium varies to no small extent. Thereafter, the head-paper distance is unstable yet. The inkjet recording head moves while discharges ink with timing determined according to a predetermined "head-paper" distance maintained by the rollers of the pairs respectively placed ahead and behind the head. Then, ink discharged with appropriate timing becomes dots on the recording medium, which are arranged at appropriate pitches, to thereby form an image. Thus, when the head-paper distance is changed during recording, or when the head-paper distance largely varies, the positions of the dots on the recording medium become unstable, so that deterioration of image quality, such as white streaks, black streaks, and textured images, may occur. The problem with the head-paper distance occurs not only in the case of recording an image on the rear end portion of the recording medium but in the case of recording an image on the front end portion thereof.

FIG. 3 is a view showing a state in which an image is recorded on the vicinity of the front end portion of the recording medium P. The recording medium P is held and conveyed only by the conveying roller M3060. In the case of recording an image on the front end portion, the conveyance of the recording medium P is performed by the conveying roller M3060 instead of the discharge rollers M3100 and M3110. Thus, the conveyance of the recording medium P is performed with higher accuracy, as compared with the state in which an image is recorded on the vicinity of the rear end portion, which is described by referring to FIG. 2.

However, the head-paper distance problem is caused due to the fact the front end of the recording medium is not held, similarly to the case of the state shown in FIG. 2. That is, the positional accuracy of the dots on the recording medium is unstable, as compared with that in the case of recording an image on a central portion of the recording medium.

To address the aforementioned problem of recording images on the front end portion and the rear end portion of the recording medium, a serial type recording apparatus employs a method of suppressing a recording width (that is, the number of recording elements actually discharging ink) of the recording head only when images are recorded on the front end portion and the rear end portion of the recording medium, and of reducing an amount of a conveyed recording medium in response thereto (see, for example, Japanese Patent Application Laid-Open No. 2004-98668). Reducing the recording width of the recording head can suppress the variation in the head-paper distance with respect to the recording width. In this case, this recording apparatus exerts the effects of suppressing textured images generated, especially, when performing multi-pass recording, which will be described later. Even when the conveying accuracy is reduced, a conveying error can be decreased by reducing the amount of the conveyed recording medium. Additionally, the pitches at which ink is discharged onto a connecting part are reduced. Thus, this recording apparatus has the effect of obscuring white streaks and black streaks.

Also, a method of suppressing the number of recording elements, which actually discharge ink, only when recording an image on the front end portion and the rear end portion of the recording medium, and of adjusting the amount of the conveyed recording medium in response thereto is employed even in an inkjet recording apparatus employing an interlace recording method. In the interlace recording method, a recording head whose recording-element arrangement density is lower than a recording density is used, and the recording of an image is completed with a plurality of recording scans while interpolating the recording density in a subscanning direction (see, for instance, Japanese Patent Application Laid-Open No. 11-291506).

However, according to the conventional recording method, in a case where the number of nozzles used to record an image on the front or rear end portion of the recording medium is reduced, as compared with that of nozzles used to record an image on the central portion of the recording medium, the rate of the number of the reduced nozzles is set to be constant, regardless of recording modes. That is, even in a high-speed mode, the number of used nozzles is limited to be about equal to that of nozzles used in a high-quality mode. Consequently, a recording time needed to record an image on the front or rear portion is relatively long.

SUMMARY OF THE INVENTION

The present invention is accomplished in view of the problems. Accordingly, an aspect of the present invention is to provide a recording apparatus and method capable of outputting an image the quality and the recording time of which are balanced, by properly changing the number of nozzles, which are used for recording an image on the front or rear end portion of a recording medium, according to a plurality of recording modes.

In one aspect of the present invention, a recording apparatus is configured to form an image by repeating a recording scanning operation and a subscanning operation. In the recording scanning operation, recording is performed according to image data while moving a recording head, in which a plurality of recording elements adapted to record an image by applying a recording agent to a recording medium are arranged in a predetermined direction, to perform scanning in a direction different from the predetermined direction. In the subscanning operation, the recording medium is conveyed in a direction intersecting with the scanning direction. The recording apparatus includes a recording control unit configured to perform the recording scanning operation such that the number of the recording elements which are used to record an image on at least one of a front end portion and a rear end portion of the recording medium is reduced at a rate as compared to that of the recording elements which are used to record an image on a central portion of the recording medium, and a recording mode selecting unit configured to select a recording mode from a plurality of recording modes differing from one another in at least one of recording quality and recording time. The recording control unit changes the rate of reduction according to the recording mode selected by the recording mode selecting unit.

In another aspect of the present invention, a recording method is configured to form an image by repeating a recording scanning operation and a subscanning operation. In the recording scanning operation, recording is performed according to image data while moving a recording head, in which a plurality of recording elements adapted to record an image by applying a recording agent to a recording medium are arranged in a predetermined direction, to perform scanning in a direction differing from the predetermined direction. In the subscanning operation, the recording medium is conveyed in a direction intersecting with the scanning direction. The recording method includes a first recording step of recording an image on a central portion of the recording medium, a second recording step of recording an image on at least one of a front end portion and a rear end portion of the recording medium by using the recording elements the number of which is less than that of the recording elements used in the first recording step, and a recording mode selecting step of selecting one recording mode from a plurality of recording modes differing from one another in at least one of recording quality and recording time. A rate of the number of the recording elements used in the second recording step to the number of the recording elements used in the first recording step changes according to a recording mode selected in the recording mode selecting step.

According to the present invention, the number of nozzles used to record images on front and rear end portions of a recording medium is appropriately changed in accordance with a recording mode. Thus, even when an image is recorded on the front or rear end portion of the recording medium, an image can be outputted with quality in a recording time according to a user's intention.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing the recording rate of the mask pattern at an end portion, that at the central portion, and an end-portion recording-rate ratio.

FIGS. 12A to 12C are graphs showing the distributions of the recording rates of the mask patterns applied in an embodiment of the invention, and a comparative example.

FIG. 28 is a view showing output patterns corresponding to input levels converted by dot-array patterning in the embodiment of the invention.

FIGS. 29A to 29C are views showing the influence of end-portion recording-rate ratios on the quality of an image.

DETAILED DESCRIPTION OF THE EMBODIMENTS

Hereinafter, embodiments of the invention are described in detail hereinbelow with reference to the accompanying drawings. First, the configuration of a main unit of an inkjet recording apparatus to which an embodiment of the invention is applied is described.

Configuration of Mechanism Units

Components of the main unit of the recording apparatus according to the present embodiment are classified into a paper supply unit, a paper conveying unit, a paper discharge unit, a carriage unit, a cleaning unit, and an exterior unit according the roles of the mechanism units. Hereinafter, an outline of each of these classified units is described.

(A) Paper Supply Unit

Figure 16:
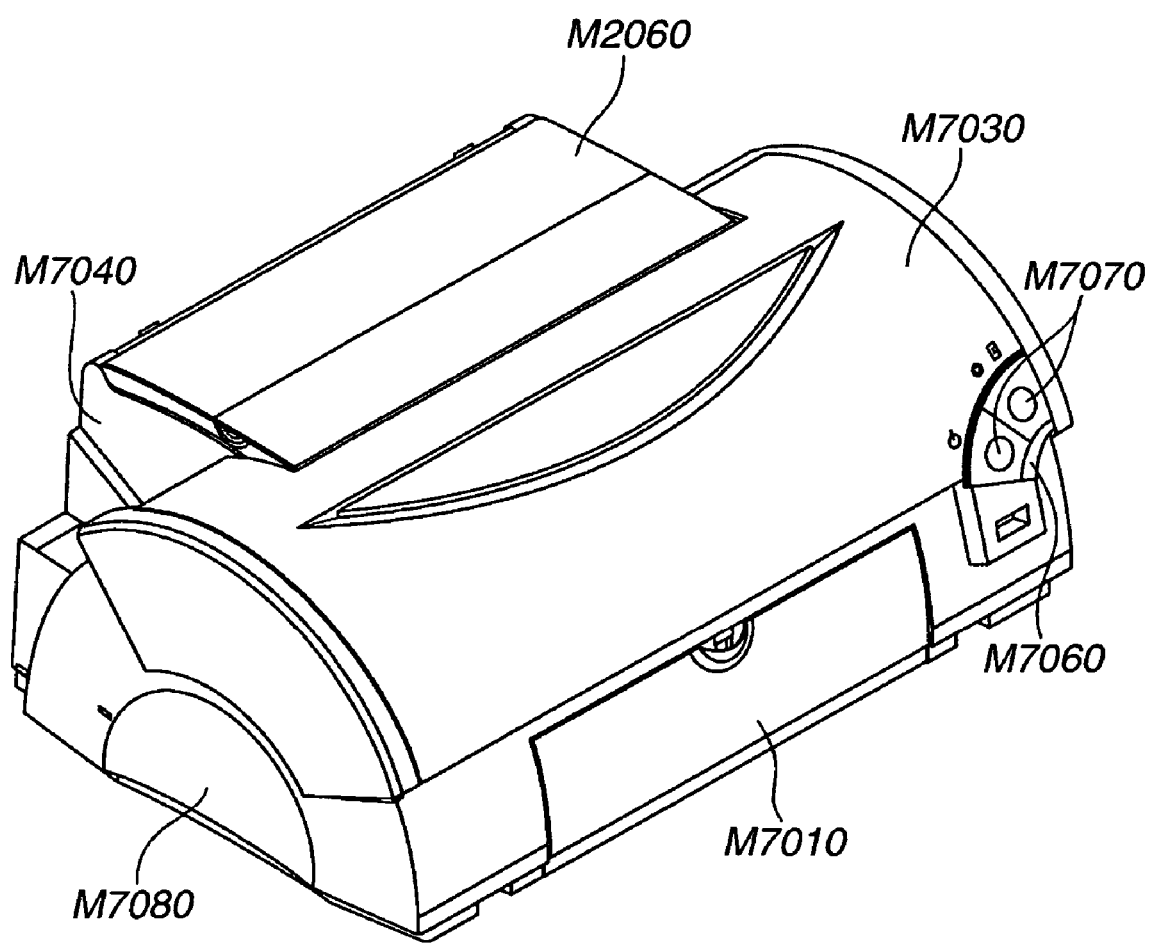
FIG. 16 is a perspective view showing a recording apparatus according to an embodiment of the invention.
Figure 17:
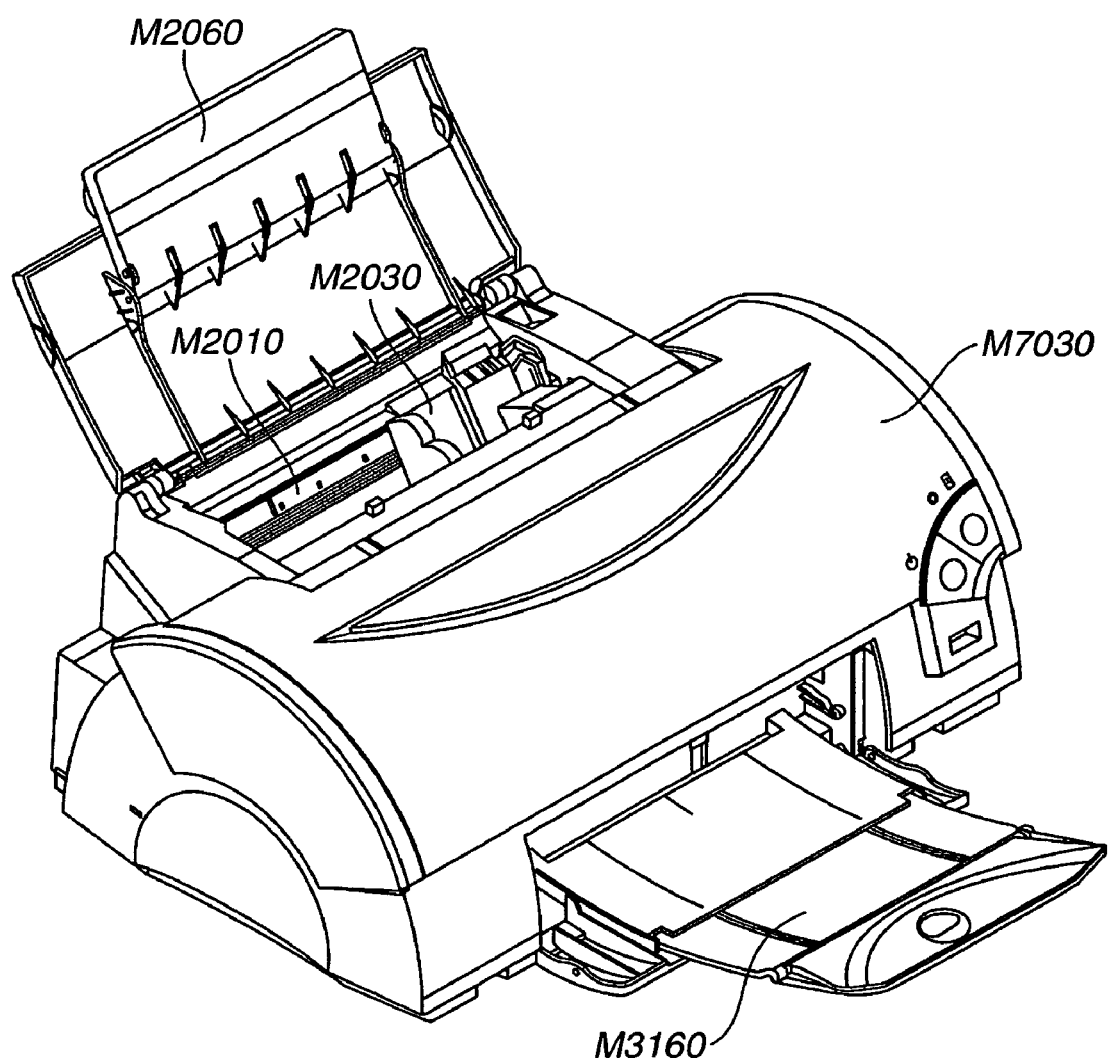
FIG. 17 is a perspective view showing the recording apparatus according to the embodiment of the invention.
Figure 18:
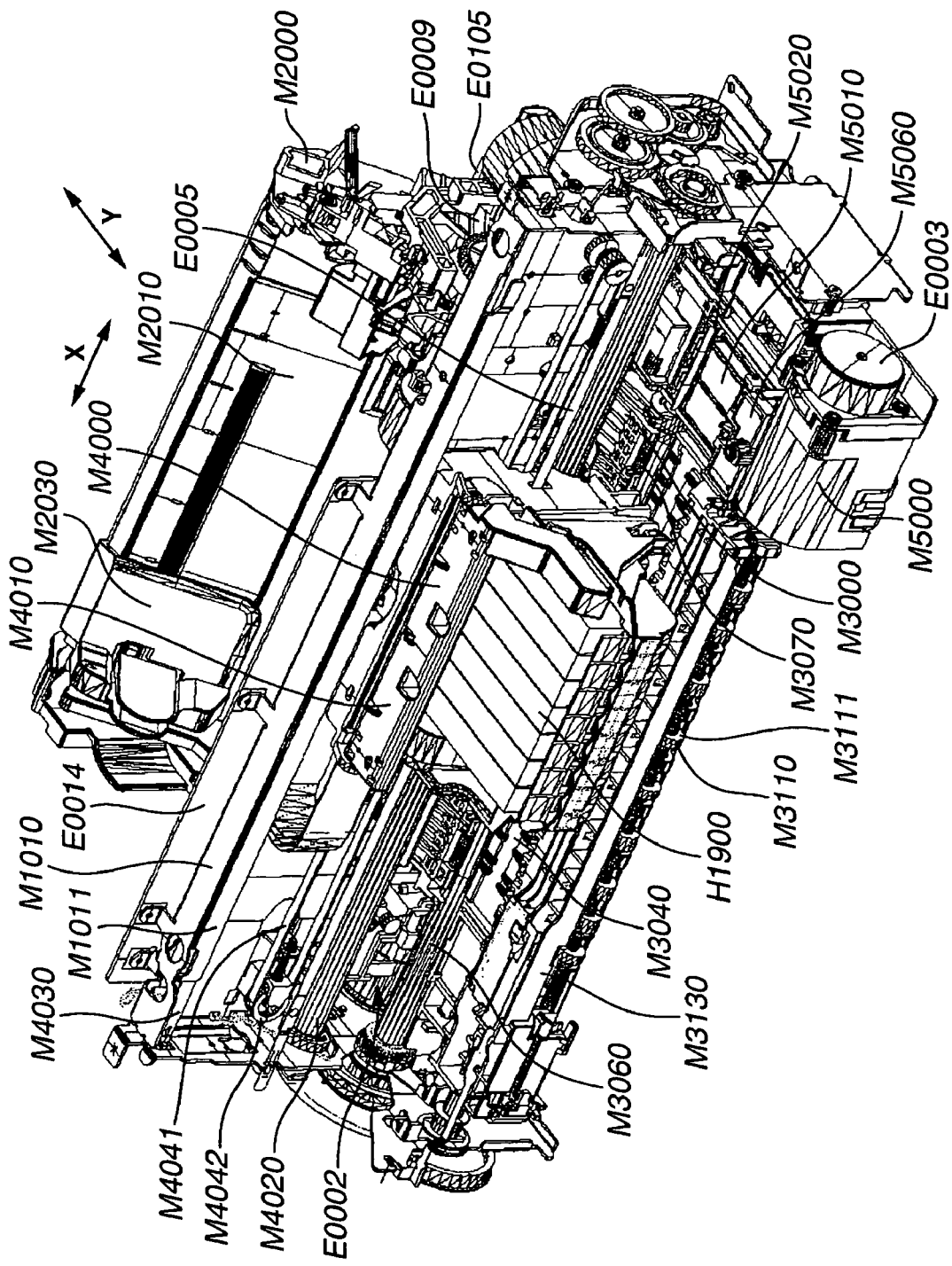
FIG. 18 is a perspective view of a mechanism unit of the recording apparatus according to the embodiment of the invention.
Figure 19:
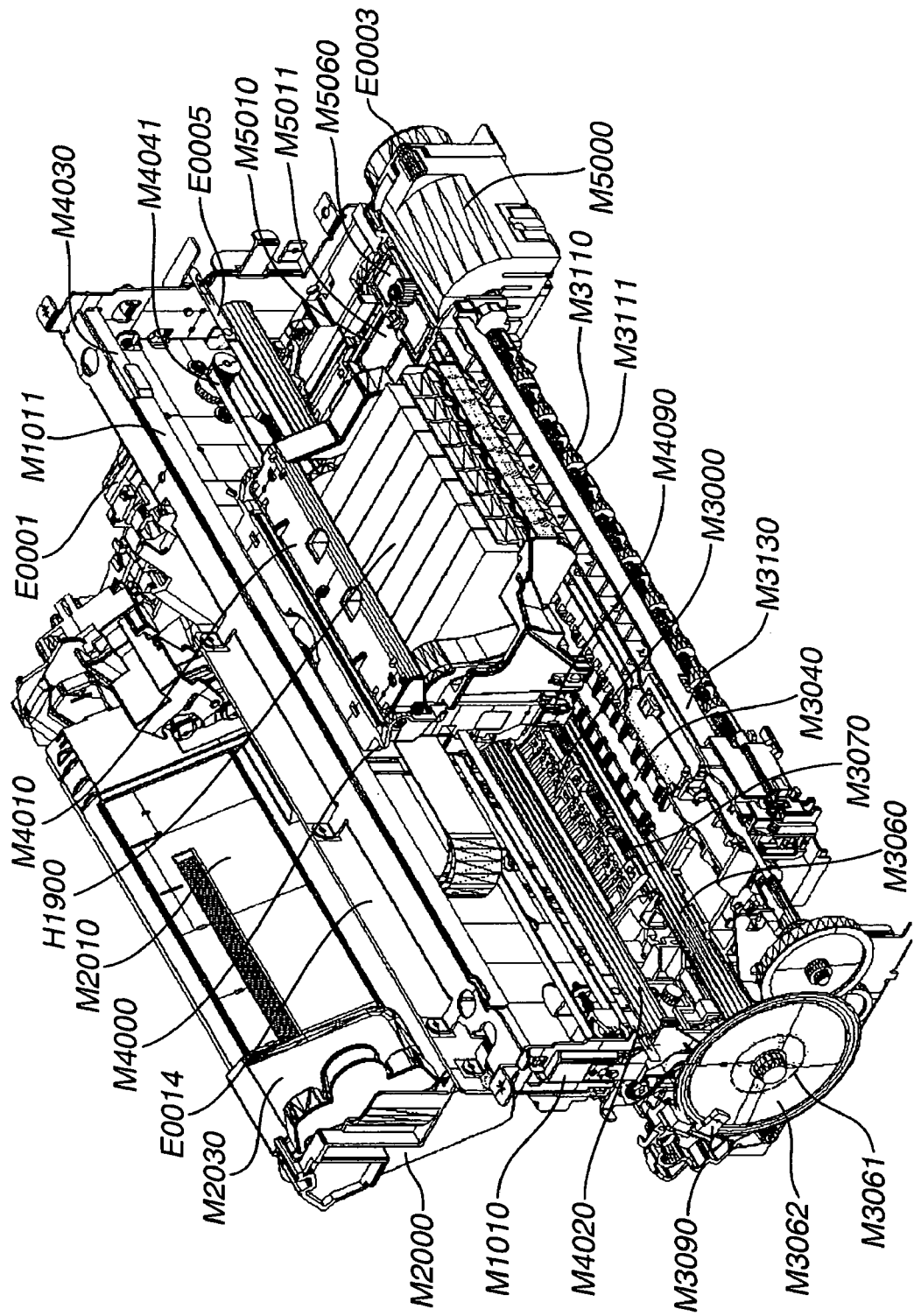
FIG. 19 is a perspective view of the mechanism unit of the recording apparatus according to the embodiment of the invention.
Figure 20:
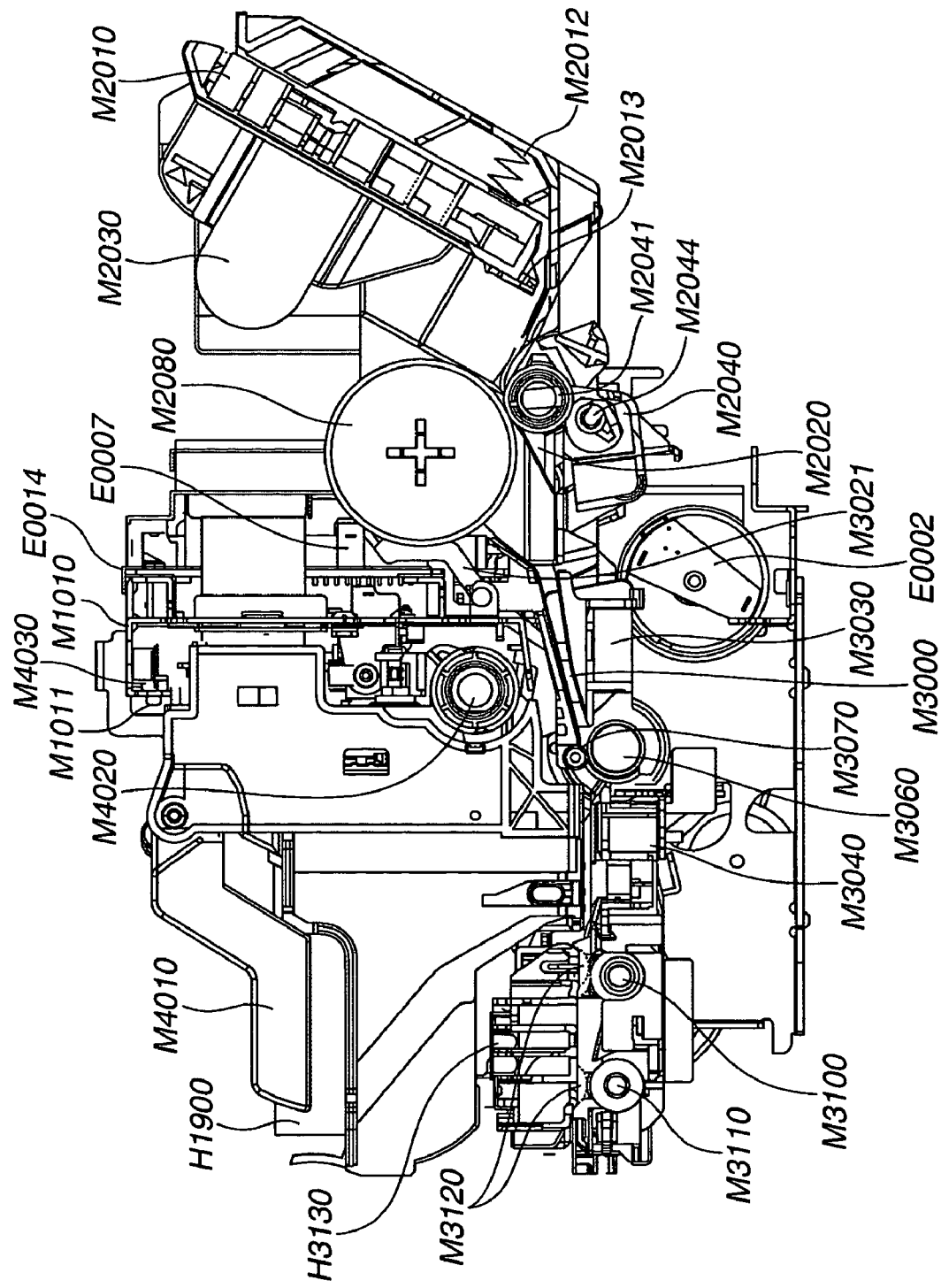
FIG. 20 is a cross-sectional view of the mechanism unit of the recording apparatus according to the embodiment of the invention.

FIGS. 16 and 17 are perspective views of the recording apparatus to which the present embodiment is applied. FIG. 16 shows an unused state of the recording apparatus. FIG. 17 shows a used state of the recording apparatus. FIGS. 18, 19, and 20 are views illustrating the internal mechanism of the main unit of the recording apparatus. FIG. 18 is a perspective view thereof, which is taken from rightward above. FIG. 19 is a perspective view thereof, which is taken from leftward above. FIG. 20 is a side cross-sectional view of the main unit of the recording apparatus.

Referring to FIGS. 16 to 20, the paper supply unit is configured so that a pressure plate M2010 on which recording media are stacked, a paper supply roller M2080 operative to supply recording media sheet by sheet, a separation roller M2041 operative to separate a recording medium, and a return lever M2020 operative to return the recording medium to a stacking position are attached to a base M2000.

A paper supply tray M2060 adapted to hold the stacked recording media is attached to the base M2000 or the exterior. The paper supply tray M2060 is of a multistage type and is used by being rotated when used.

The paper supply roller M2080 is formed like a bar that is cross-sectionally circular. A separation roller rubber is provided to the side of a paper reference to thereby supply a recording medium. A driving force of the paper supply roller M2080 is transmitted from an exclusive ASF motor E0105, which is provided in the paper supply unit, through a drive transmission gear (not shown), and a planet gear (not shown).

A movable side guide M2030 is movably provided on the pressure plate M2010 and regulates a position at which recording media are stacked. The pressure plate M2010 can rotate around a rotation shaft connected to the base 2000. The pressure plate 2010 is pushed by a pressure plate spring M2012 against the paper supply roller M2080. A separation sheet M2013 made of a material, such as artificial leather, having a large friction coefficient is provided at part of the pressure plate M2010, which part is opposed against the paper supply roller M2080, so as to prevent the overlapped media feeding of the recording media. The pressure plate M2010 is configured to be enabled by a pressure plate cam to abut against and get apart from the paper supply roller M2080.

A separation roller holder M2040, to which the separation roller M2041 operative to separate the recording media sheet by sheet is attached, is provided on the base M2000 rotatably around the rotation shaft provided on the base M2000. The separation roller holder M2040 is pushed by a separation roller spring (not shown) against the paper supply roller M2080. A clutch (not shown) is attached to the separation roller M2041. When a load having a predetermined value or more is applied thereto, a part, to which the separation roller M2041 is attached, is adapted to rotate. The separation roller M2041 is configured to be enabled by a separation roller release shaft M2044 and a control cam (not shown) to abut against and get apart from the paper supply roller M2080. The positions of the pressure plate M2010, the return lever M2020, and the separation roller M2041 are detected by an automatic sheet feed sensor (hereunder referred to as the ASF sensor) E0009.

The return lever M2020 operative to return the recording medium to the stacking position is rotatably attached to the base M2000, and is pushed by a return lever spring (not shown) in a release direction. The return lever M2020 is configured to be rotated by the control cam when the recording medium is returned thereto.

A state, in which sheets of paper are supplied by using the mechanism units described above, is described hereinbelow.

In an ordinary standby state, the pressure plate M2010 is released by the pressure plate cam, while the separation roller M2041 is released by the control cam. The return lever M2020 is provided at the stacking position to close a stacking opening so as to return the recording medium and to prevent the stacked recording media from being moved toward the innermost part thereof.

When sheets of paper are supplied, the separation roller M2041 is driven by a motor to abut against the paper supply roller M2080. Then, the return lever M2020 is released, so that the pressure plate M2010 abuts against the paper supply roller M2080. In this state, the supply of the recording media is commenced. The recording media is restricted by a precedent stage separation unit (not shown) provided on the base M2000. Only a predetermined number of recording media are sent to a nip portion including the paper supply roller M2080 and the separation roller M2041. The sent recording media are separated at the nip portion, so that only the top recording medium is conveyed.

When the recording medium reaches the conveying roller M3060 and the pinch roller M3070, the pressure plate M2010 is released by a pressure plate cam (not shown). The separation roller M2041 is released by the control cam. The return lever M2020 is returned by the control cam to the stacking position. Consequently, the recording medium having reached the nip portion including the paper supply roller M2080 and the separation roller M2041 is returned to the stacking position.

(B) Paper Conveying Unit

The conveying roller M3060, which conveys the recording medium, and a paper end sensor (hereunder referred to as a PE sensor) E0007 are rotatably attached to a chassis M1010 constituted by an upwardly bent plate. The conveying roller M3060 is configured so that a surface of a metal shaft is coated with ceramic fine particles. The conveying roller M3060 is attached to the chassis M1010 in a state in which each of metallic parts of both ends of the shaft is received by bearings (not shown). A roller tension spring (not shown) is provided between the bearing and the conveying roller 3060, and pushes the conveying roller M3060 to thereby apply an appropriate amount of load thereto. Consequently, the recording medium can stably be conveyed.

A plurality of driven pinch rollers M3070 are provided to abut against the conveying roller M3060. The pinch roller M3070 is held by the pinch roller holder M3000 and is pressure-contacted to the conveying roller M3060 by being pushed by a pinch roller spring (not shown). This generates a conveying force used to convey the recording medium. At that time, the rotation shaft of the pinch roller holder M3000 is attached to the bearings of the chassis M1010 and rotates therearound.

A paper guide flapper M3030 and a platen M3040, which guide the recording medium, are disposed in an inlet portion to which the recording medium is conveyed. Further, a PE sensor lever M3021 is provided in the pinch roller holder M3000. The PE sensor lever M3021 serves to inform the PE sensor E0007 of the detection of a front end and a rear end of the recording medium. The platen M3040 is attached to the chassis M1010 and is positioned thereto. The paper guide flapper M3030 can rotate around a bearing unit (not shown) and is positioned by abutting against the chassis M1010. The bearing unit is fitted to the conveying roller M3060 and slides.

A recording head H1001 is provided at the downstream side in a recording medium conveying direction of the conveying roller M3060.

A process of conveying the recording medium in the apparatus of the aforementioned configuration is described hereinbelow. The recording medium sent to the paper conveying unit is guided by the pinch roller holder M3000 and the paper guide flapper M3030 and is sent to a roller pair of the conveying roller M3060 and the pinch roller M3070. At that time, the PE sensor lever M3021 detects an edge of the recording medium to thereby obtain a recording position corresponding to the recording medium. The roller pair of the conveying roller M3060 and the pinch roller M3070 is rotated by being driven by an LF motor E0002. This rotation causes the recording medium to be conveyed on the platen M3040. A rig serving as a conveyance reference surface is formed on the platen M3040. The gap between the recording head H1001 and a surface of the recording medium is controlled by this rib. Simultaneously, the rib serves, together with a paper discharge unit (to be described later), to suppress flapping of the recording medium. A sponge portion (not shown) is provided on the platen M3040. When an image is formed on the front end portion or the rear end portion of the recording medium, the image is formed by using nozzles provided at positions corresponding to the sponge portion.

A driving force used to rotate the conveying roller M3060 is obtained by transmitting torque of the LF motor E0002 including, for example, a DC motor to a pulley M3061 disposed on the shaft of the conveying roller M3060 through a timing belt (not shown). A code wheel M3062 adapted to detect an amount of a recording media conveyed by the conveying roller M3060 is provided on the shaft of the conveying roller M3060. An encode sensor M3090 used to read a marking formed on the code wheel M3062 is disposed on the adjacent chassis M1010. Incidentally, the marking formed on the code wheel M3062 is assumed to be formed at a pitch of 150 to 300 lpi (line/inch).

(C) Paper Discharge Unit

The discharge unit includes a first paper discharge roller M3100, a second paper discharge roller M3110, and a plurality of spurs M3120, and a gear train.

The first paper discharge roller M3100 is constituted by a metal shaft and a plurality of rubber portions wound around the metal shaft. The first paper discharge roller M3100 is driven by the driving force of the conveying roller M3060 being transmitted thereto through an idler gear (not shown).

The second paper discharge roller M3110 is constituted by a plastic shaft and a plurality of elastic elements M3111 made of elastomer wound around the plastic shaft. The second paper discharge roller M3110 is driven by the driving force of the first paper discharge roller M3100 being transmitted thereto through an idler gear (not shown).

The spur M3120 is formed by integrating a circular thin plate made of, for example, SUS, on the periphery of which a plurality of convex portions is provided, with a resin part. The plurality of spurs M3120 are attached to a spur holder. This attachment of the spurs is performed by using a spur spring obtained by forming a coil spring like a stick. Simultaneously, a resilient force of the spur spring causes the spurs M3120 to abut against the discharge rollers M3100 and M3110 at a predetermined pressure. With this configuration, the discharge rollers M3120 are rotatable by following the two discharge rollers M3100 and M3110. Some of the spurs M3120 are provided at the position of the rubber portion of the first discharge roller M3100 or at the position of the elastic element M3111 of the second discharge roller M3110 and serves mainly to generate a force of conveying the recording medium. Some of the rest of the spurs M3120 are provided at a place, at which the rubber portion and the elastic element M3111 are not provided, and serve mainly to suppress the lift of the recording medium.

Also, the gear train serves to transmit the driving force of the conveying roller M3060 to the discharge rollers M3100 and M3110.

A paper edge support (not shown) is provided between the first discharge roller M3100 and the second discharge roller M3110. The paper edge support takes up both ends of the recording medium and then holds the recording medium ahead of the first discharge roller M3100. Thus, the paper edge support serves to protect records recorded on the recording medium from the friction by the carriage. Practically, a resin member, at the end of which a roller (not shown) is provided, is pushed by a paper edge support spring (not shown) to thereby press the roller against the recording medium at a predetermined pressure. Thus, both ends of the recording medium are lifted, so that the recording medium has resilience and can be held at a predetermined place.

The recording medium, on which an image is formed by using the aforementioned units, is nipped between the first discharge roller M3110 and the spur M31210, and then is conveyed to be discharged to a paper discharge tray M3160. The discharge tray M3160 is divided into a plurality of parts and is configured to be accommodated under a lower case M7080 that will be described later. When used, the tray 3160 is drawn out therefrom. The discharge tray M3160 is designed to increase in height toward a front end thereof, and is also designed so that both ends thereof are held at a high position. Thus, the discharge tray M3160 enhances the stackability of recording media and prevents the recording surface of a recording medium being scratched.

(D) Carriage Unit

The carriage unit has a carriage M4000 to which the recording head H1001 is attached. The carriage M4000 is supported by a guide shaft M4020 and a guide rail M1011. The guide shaft M4020 is attached to the chassis M1010, and guides and supports the carriage to cause the carriage M4000 to perform reciprocating scan in a direction perpendicular to a recording medium conveying direction in which a recording medium is conveyed. The guide rail M1011 is formed integrally with the chassis M1010 and serves to hold the rear end of the carriage M4000 and to maintain the space between the recording head H1001 and the recording medium. A slide sheet M4030 formed of a thin plate made of stainless steel is stretched on a side of the guide rail M1011, on which the carriage M4000 sides. Consequently, the sliding noises of the recording apparatus can be reduced.

The carriage M4000 is driven through a timing belt M4041 by a carriage motor E0001 attached to the chassis M1010. The timing belt M4041 is stretched and supported by an idle pulley M4042. Further, the timing belt M4041 is connected to the carriage M4000 through a carriage damper made of rubber. Thus, image irregularity is reduced by attenuating the vibration of the carriage motor E0001.

An encoder scale E0005 operative to detect the position of the carriage M4000 is provided in parallel to the timing belt M4041. Markings are formed at pitches, which range from 150 lpi to 300 lpi, on the encoder scale E0005. An encoder sensor E0004 (to be described later with reference to FIG. 21) operative to read the markings is provided on a carriage printed circuit board E0013 (to be described later with reference to FIG. 21). The carriage printed circuit board E0013 is provided with a head connector E0101, which is electrically connected to the recording head H1001. A flexible cable E0012 (which is described later with reference to FIG. 21) operative to transmit a drive signal from an electric substrate E0014 to the recording head H1001 is connected to the carriage M4000.

An abutting unit (not shown) operative to position the recording head H1001 by pushing the recording head H1001 against the carriage M4000, and a pressing unit (not shown) used to fix the recording head H1001 at a predetermined position are provided on a headset lever M4010 as devices used to fix the recording head H1001 to the carriage M4000. The pressing unit is mounted on the headset lever M4010 and is adapted to act upon the recording head H1001 by turning the headset lever M4010 around a rotation support when the recording head H1001 is set.

Also, a position detection sensor M4090 includes a reflection type optical sensor, which is used when image data is recorded on a special medium, such as a CD-R, or when the position of a recorded medium or that of an edge of paper is detected, is attached to the carriage M4000. The position detection sensor M4090 can detect the current position of the carriage M4000 by causing a light emitting device to emit light and by then receiving the emitted light, which is reflected by the carriage M4000.

In a case where an image is formed on a recording medium in the apparatus, regarding a row position, the positioning of the recording medium is performed by conveying the recording medium by the roller pair of the conveying roller 3060 and the pinch roller M3070. Regarding a column position, the positioning of the recording medium is performed by using the carriage motor E0001 to move the carriage M4000 in a direction perpendicular to the conveying direction. Thus, the recording head H1001 is placed at a target position at which an image is formed. The positioned recording head H1001 discharges ink onto the recording medium according to a signal sent from the electric substrate E0014. The details of the configuration of the recording head H1001 and a recording system are described later. The recording apparatus is configured according to the present embodiment to form an image on a recording medium by alternately repeating a recording main scan, in which the carriage M4000 scans in a column direction while recording is performed by the recording head H1001, and a subscan, in which the recording medium is conveyed in a row direction by the conveying roller M3060.

(E) Cleaning Unit

The cleaning unit includes a pump M5000, which is used to perform cleaning on the recording head H1001, a cap M5010, which reduces the drying of the recording head H1001, and a blade M5020, which performs cleaning on a discharging opening formation face of the recording head H1001. An exclusive cleaning motor E0003 is disposed in the cleaning unit. A one-way clutch (not shown) is provided in the cleaning motor E0003. The pump M5000 operates by rotating in one direction. When the pump M5000 rotates in the other direction, the blade M5020 operates. Simultaneously, a rise-and-fall operation of the cap M5010 is performed.

The pump M5000 is configured so that a pump roller (not shown) squeezes a tube (not shown) to thereby generate a negative pressure. The cap M5010 is connected to the pump M5000 through a valve (not shown). When the pump M5000 is operated in a state in which the cap M5010 is in close contact with the ink discharging opening of the recording head H1001, unnecessary ink is absorbed from the recording head H1001. A cap absorbing element M5011, which reduces ink left on the face surface of the head H1001 after the ink is absorbed, is provided at an inner part of the cap M5010. Further, ink left in the cap M5010 is absorbed in a state in which the cap M5010 is opened. Thus, it is taken into consideration to prevent the residual ink from being solidified, and from causing subsequent harmful effects. Incidentally, the ink absorbed by the pump M5000 is treated as waste ink, which is then absorbed and held by a waste ink absorber provided in a lower case M7080.

A sequence of operations, such as an operation of the blade 5020, the rise-and-fall of the cap M5010, and the opening-and-closing of the valve, is controlled by a main cam (not shown) provided with a plurality of cams on a shaft thereof. Cams and arms provided at various parts are operated by the main cam, and are enabled to perform predetermined operations. The position of the main cam can be detected by the position detection sensor, such as a photo interrupter. When the cap M5010 falls, the blade M5020 moves in a direction perpendicular to the scanning direction of the carriage M4000 and performs cleaning on the face surface of the recording head H1001. A plurality of the blades M5020 are provided in the unit. Some of the blades M5020 are used to perform cleaning on the vicinity of the nozzles of the recording head H1001, while the other of the blades M5020 are used to perform cleaning on the entire face surface thereof. The apparatus is configured so that when the carriage M4000 moves to the innermost part of the apparatus, ink adhering to the blades M5020 themselves can be removed by being made to abut against the blade cleaner M5600.

(F) Exterior Unit

Each of the units described in (A) to (E) is incorporated mainly into the chassis M1010 and constitutes the mechanism unit of the recording apparatus. The exterior unit is attached thereto to cover the mechanism unit. The exterior unit includes mainly the lower case M7080, an upper case M7040, an access cover M7030, a connector cover, and a front cover M7010.

A paper discharge tray rail (not shown) is provided at a lower part of the lower case M7080 and can accommodate the divided discharge tray M3160. The front cover M7010 is configured to close the discharging opening when the apparatus is unused.

The access cover M7030 is attached to the upper case M7040 and is configured to be turnable. A part of the top surface of the upper case M7040 has an opening portion. The apparatus is configured so that in this position, each of the ink tank H1900 and the recording head H1001 can be replaced with a new one. Incidentally, in the recording apparatus according to the present embodiment, the head cartridge is configured so that a plurality of recording heads each of which can discharge ink of one color, that the plurality of recording heads respectively correspond to a plurality of different colors, that a recording head unit includes the plurality of recording heads provided integrally with one another, and that the ink tanks H1900 respectively corresponding to the colors can be attached and detached independent of one another. Also, a door switch lever (not shown) operative to detect the opening/closing of the access cover M7030, an LED guide M7060 operative to transmit and display light from an LED, and a key switch M7070 operative to act upon a switch (SW) of the substrate are provided in the upper case M7040. Also, a multistage type paper supply tray M2060 is turnably attached to the upper case M7040. When the paper supply unit is not used, the paper supply tray M2060 is accommodated therein. Thus, the upper case M7040 is configured to serve also as a cover for the paper supply unit.

The upper case M7040 and the lower case M7080 are attached to each other by elastic fitting claws. A part provided with a connector portion therebetween is covered with a connector cover (not shown).

Electrical Configuration

Next, the configuration of an electrical circuit of the present embodiment is described below.

Figure 21:
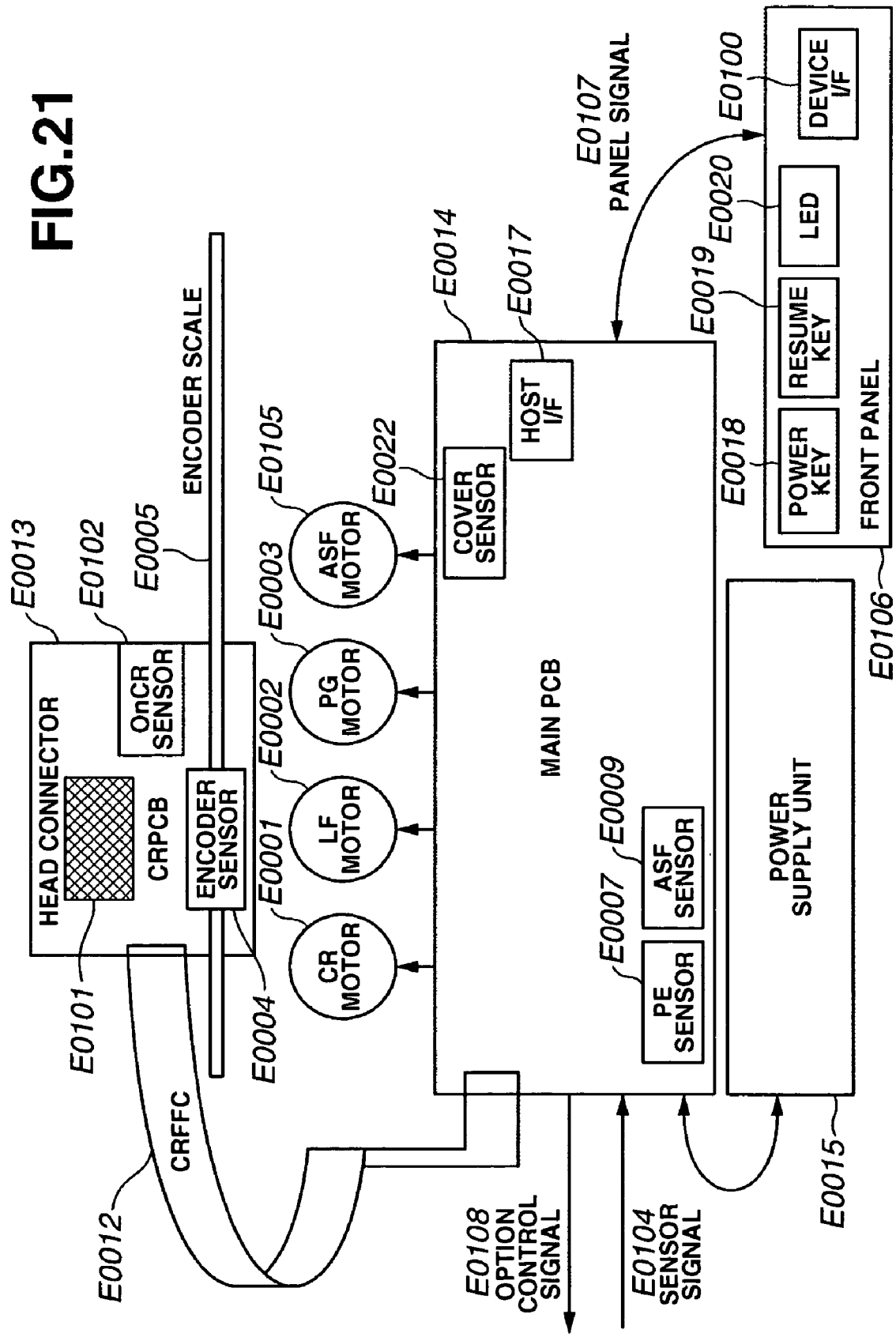
FIG. 21 is a block diagram schematically showing the entire configuration of an electric circuit of the embodiment of the invention.

FIG. 21 is a block diagram schematically showing the entire configuration of an electrical circuit of the present embodiment.

In the recording apparatus to which the present embodiment is applied, the electrical circuit includes a carriage printed circuit board E0013, a main PCB E0014, a power supply unit E0015, a front panel E0106.

Incidentally, the power supply unit E0015 is connected to the main PCB E0014 and supplies various kinds of drive power.

The carriage printed circuit board E0013 is a printed circuit board unit mounted on the carriage M4000, and functions as an interface adapted to transmit and receive signals to and from the recording head H1001. Also, the carriage printed circuit board unit E0013 detects a change in the positional relation between the encoder scale E0005 and the encoder sensor E0004 according to pulse signals outputted from the encoder sensor E0004 as the carriage M4000 moves. Also, the carriage printed circuit board unit E0013 outputs output signals of the encoder scale E0005 and the encoder sensor E0004 to the main PCB E0014 through a flexible flat cable (CRFFC) E0012. A temperature sensor, such as a thermistor, which is operative to detect an ambient temperature, and a predetermined optical sensor (hereunder, there sensors are referred to as OnCR sensors E0102). Information obtained by the OnCR sensor E0102 is outputted, together with head temperature information sent from the recording head cartridge H1000, to the main PCB E0014 through the flexible flat cable (CRFFC) E0012.

The main PCB E0014 is a printed circuit board unit that serves to drive and control each of parts of the inkjet recording apparatus according to the present embodiment. The paper edge detection sensor (PE) sensor E0007, the automatic sheet feeder (ASF) sensor E0009, the cover sensor E0022, and the host interface (host I/F) E0017 are provided on the main PCB E0014. The main PCB E0014 is connected to various kinds of motors, such as the carriage motor E0001 serving as a drive power supply for performing main scan of the carriage M4000, the LF motor E0002 serving as a power supply for conveying a recording medium, a PG motor E0003 serving as a power supply for performing a recording head recovery operation, an ASF motor E0105 serving as a drive power supply for an operation of supplying a recording medium. Further, the main PCB E0014 controls an operation of performing such functions. Also, the main PCB E0014 receives sensor signals E0104 that are outputted from various sensors, such as an ink empty sensor, a media (or paper) discrimination sensor, a carriage position (height) sensor, an LF encoder sensor, and a PG sensor, and that represent the mounting state and the operating conditions of various optional units. Further, the main PCB E0014 outputs option control signals E0108 so as to drive and control the various optional units. The main PCB E0014 has an interface that is connected to each of the CRFFC E0012, the power supply unit E0015, and the front panel E0106, and that is used to transfer information thereamong.

The front panel E0106 is provided at the front of the main unit of the recording apparatus, for convenience of users' operations. The front panel E0106 has a resume key E0019, an LED E0020, a power key E0018, and a device I/F E0100 that is used to connect the recording apparatus to peripheral devices, such as a digital camera.

Figure 22:
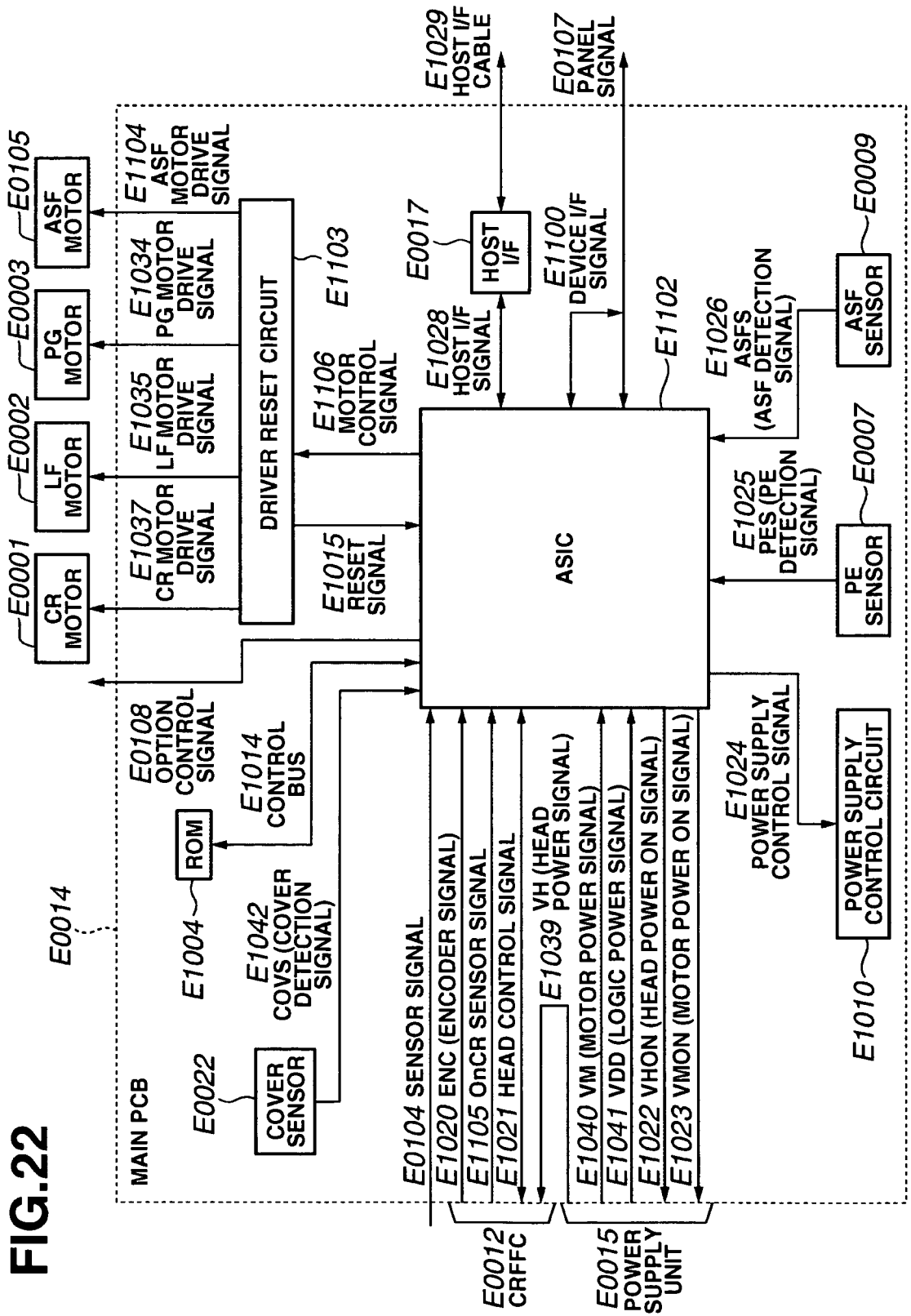
FIG. 22 is a block diagram showing an example of the internal configuration of a main PCB (Printed Circuit Board).

FIG. 22 is a block diagram showing the internal configuration of the main PCB E1004.

Referring to FIG. 22, reference character E1102 designates an ASIC, which is connected to a ROM E1004 through a control bus E1014 and which performs various control operations according to programs stored on the ROM E1004. For example, the ASIC E1102 detects the states of outputs from the sensors provided on the main PCB E1004, a sensor signal E0104, a sensor signal E1105 outputted from the OnCR sensor provided on the CRPCB E0013, an encoder signal E1020, and outputs from the power key E0018 and the resume key E0019 provided on the front panel E0106. Further, the ASIC E1102 performs various logic operations and conditional determination according to signals representing the connection states and the data input states from the host I/F E0017, and the device I/F E0100 provided on the front panel E0106. Thus, the ASIC controls the composing elements of the inkjet recording apparatus and controls the drive of the inkjet recording apparatus.

Reference character E1103 designates a driver reset circuit employing the motor power supply (VM) E1040 as a drive power supply. The driver reset circuit E1103 generates a CR motor drive signal E1037, an LF motor drive signal E1035, a PG motor drive signal E1034, and an ASF motor drive signal E1104 according to a motor control signal E1106 outputted from the ASIC E1102 to thereby control each of the motors. Further, the driver reset circuit E1103 has a power supply circuit and supplies necessary electric power to each of the main PCB E0014, the CRCPCB E0013, and the front panel E0106. Furthermore, the driver reset circuit E1013 detects a drop of a power supply voltage, and generates a reset signal E1015 to perform initialization.

Reference character E1010 designates a power supply control circuit that controls the supply of electric power to each of the sensors, which have light emitting devices, according to a power supply control signal E1024 outputted from the ASIC E1102.

The host I/F E0017 transmits a host I/F signal E1028, which is outputted from the ASIC E1102, to a host I/F cable E1029 connected to the exterior. Also, the host I/F E0017 transmits a signal, which is transmitted through the cable E1029, to the ASIC E1102.

Meanwhile, the power supply unit E0015 supplies ahead power signal (VH) E1039, a motor power signal (VM) E1040, and a logic power signal (VDD) E1041. A head power ON signal (VHON) E1022 and a motor power ON signal (VMON) E1023, which are outputted from the ASIC E1102, are inputted to the power supply unit E0015 to thereby control on/off of the head power supply E1039 and the motor power supply E1040. The logic power signal (VDD) E1041 supplied from the power supply unit E0015 is voltage-converted, as required, and is supplied to each of components of the main PCB E0014.

A head power signal E1039 is sent to the CRFFC E0012 after being smoothed by the main PCB E0014. Then, the head power signal E1039 is used to drive the recording head cartridge H1000.

The ASIC E1102 is a single-chip processor incorporating a semiconductor integrated circuit and outputs the motor control signal E1106, the option control signal E0108, the power supply control signal E1024, the head power ON signal E1022, and the motor power ON signal E1023. Further, the ASIC E1102 sends and receives signals to and from the host I/F E0017, and sends and receives signals to and from the device I/F E0100 provided on the front panel E0106 through a panel signal E0107. Also, the ASIC E1102 detects the states of a PE detection signal (PES) E1025 outputted from the PE sensor E0007, an ASF detection signal (ASFS) E1026 outputted from the ASF sensor E0009, a cover detection signal (COVS) E1042 outputted from the cover sensor E0022, the panel signal E0107, the sensor signal E0104, and the OnCR sensor signal E1105. The ASIC E1102 blinks the LED E0020 provided on the front panel E0106 by controlling the drive of the panel signal E0107.

The ASIC E1102 detects the state of the encoder signal (ENC) E1020 and generates a timing signal. Also, the ASIC E1102 interfaces with the recording head cartridge H1000 by a head control signal E1021 to thereby control a recording operation. Incidentally, the encoder signal (ENC) E1020 is an output signal of the CR encoder sensor E0004 and is inputted through the CRFFC E0012. Further, the head control signal E1021 is supplied to the recording head H1001 through the flexible flat cable E0012, the carriage printed circuit board E0013, and the head connector E0101.

Figure 23:
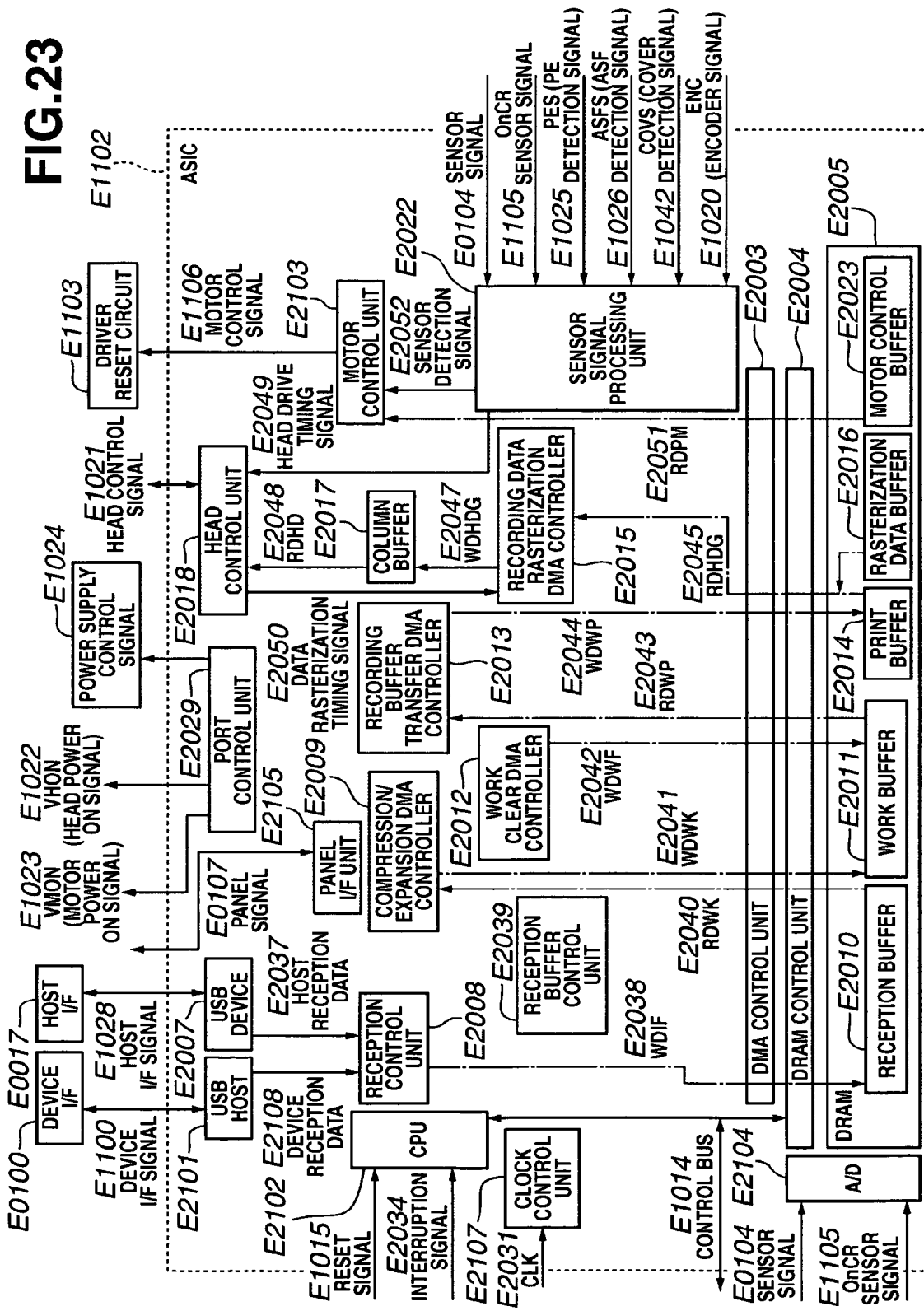
FIG. 23 is a block diagram showing the internal configuration of ASIC (Application Specific Integrated Circuit).

FIG. 23 is a block diagram showing an example of the internal configuration of the ASIC E1102. Regarding each connection between blocks, FIG. 23 shows only flows of recording data and data that relates to the control of the head and the electromechanical components, such as motor control data. For simplicity of drawing, control signals and clock signals, which are associated with read/write from and to each register incorporated in each block, and control signals associated with DMA control operations are omitted.

In FIG. 23, reference character E2107 designates a clock control unit, to which a clock signal (CLK) E2031 from a clock oscillating circuit (not shown) is provided. The clock control unit E2107 generates clock signals (not shown), which are supplied to most of the ASIC E1102, by converting the frequency thereof, as required.

Reference character E2102 denotes a CPU that performs the control of read and write of registers in each block, the supply of a clock signal to a part of blocks, and the acceptance of an interruption signal, which are described hereinbelow, in response to a reset signal E1015, an interruption signal E2034, which is outputted from each block of the ASIC, and a control signal from the control bus E1014. The CPU E2102 contains a RAM and receives a print file from an external device through the device I/F E0100, and also performs the conversion of the print file to recording data.

Reference character E2005 designates a DRAM serving as a recording data buffer, which has regions, such as a reception buffer E2010, a work buffer E2011, a print buffer E2014, and a rasterization data buffer E2016, and also has a motor control buffer E2023 used to control the motors.

The DRAM E2005 is used also as a work area necessary for an operation of the CPU E2102. That is, read/write operations from and to the DRAM E2005 are performed by switching between an access to the DRAM E2005 from the CPU E2102 through the control bus E1014 and an access to the DRAM E2005 from a DMA control unit E2003, which will be described later, under the control of a DRAM control unit E2004.

The DMA control unit E2003 receives a request signal (not shown) from each block and outputs write data E2038, E2041, E2042, and E2044, together with an address signal and a control signal (not shown), in the case of a write operation, to thereby perform a DRAM access. In the case of a read operation, the DMA control unit E2003 transfers read data E2040, E2043, E2045, and E2051 from the DRAM control unit E2004 to blocks that are sources of requests.

Reference character E2007 denotes a Universal Serial Bus (USB) device serving as a two-way communication interface with external host equipment (not shown) through the host I/F E0017 under the control of the CPU E2102. Additionally, at the time of recording of data, the USB device E2007 transfers data (that is, host reception data E2037) received from the host I/F E0017 to a reception control unit E2008 by performing a DMA process.

Reference character E2101 designates a USB host serving as a two-way communication interface with external device equipment (not shown) through the device I/F E0100 under the control of the CPU E2102. Additionally, at the time of recording of data, the USB host E2101 transfers data (that is, device reception data E2108) received from the device I/F E0100 to the reception control unit E2008 by performing a DMA process.

The reception control unit E2008 writes data (WDIF) E2038 received from the I/F, which is connected to a selected one of the USB device E2007 and the USB host E2101, to a reception buffer write address managed by a reception buffer control unit E2039.

Reference character E2009 denotes a compression/expansion DMA controller configured to read reception data (that is, raster data), which is stored in the reception buffer E2010, from a reception buffer read address, which is managed by the reception buffer control unit E2039, under the control of the CPU E2102. Further, the compression/expansion DMA controller E2009 compresses or expands the data (RDWK) E2040 according to a designated mode. Then, obtained recording codes are rearranged according to addresses, which are suited for an order of transferring data to the recording head cartridge H1000, on the work buffer E2011 and are transferred thereto. Thus, the recording codes are written to a work buffer area as a recording code string (WDWK) E2041.

Reference character E2013 denotes a recording buffer transfer DMA controller configured to read a recording code (RDWP) E2043, which is stored in the work buffer E2011, under the control of the CPU E2102, and transfers the recording code (WDWP) E2044 to the print buffer E2014.

Reference character E2012 designates a work clear DMA controller configured to repeatedly write designated work fill data (WDWF) E2042 to an area, from which the transfer of the code is completed by the recording buffer transfer DMA controller E2013, on the work buffer E2011 under the control of the CPU E2102.

Reference character E2015 denotes a recording data rasterization DMA controller that reads the recording data, which is written to the print buffer E2014, and rasterization data (that is, rasterization recording data (RDHDG) E2045), which is written to the rasterization data buffer E2016, under the control of the CPU E2102 by using a data rasterization timing signal E2050, which is sent from a head control unit E2018, as a trigger. Further, the recording data rasterization DMA controller E2015 writes the read data to a column buffer E2017 as column buffer write data (WDHDG) E2047. Incidentally, the column buffer E2017 is an SRAM that temporarily stores the data (that is, the rasterization recording data), which is transferred to the recording head cartridge H1000, and that is shared and is commonly managed by both the recording data rasterization DMA controller E2015 and the head control unit E2018 by using handshaking signals exchanged therebetween.

The head control unit E2018 interfaces with the recording head cartridge H1000 through a head control signal under the control of the CPU E2102. Also, the head control unit E2018 outputs a data rasterization timing signal E2050 to the recording data rasterization DMA controller E2015 according to a head drive timing signal E2049 sent from a sensor signal processing unit E2022. Also, at the time of recording of data, the head control unit E2018 reads rasterization recording data (RDHD) E2048 from the column buffer E2017 according to a head drive timing signal E2049, and outputs to the recording head cartridge H1000 a head control signal E1021 representing the read data.

The sensor signal processing unit E2022 receives a sensor signal E0104, an OnCR sensor signal E1105, a PE detection signal E1025, an ASF detection signal E1026, and a cover detection signal E1042, and transmits such sensor information to the CPU E2102 according to a mode determined under the control of the CPU E2102. Also, the sensor signal processing unit E2022 outputs a sensor detection signal E2052 to a motor control unit E2103. Further, the sensor signal processing unit E2022 receives an encoder signal (ENC) E1020 and outputs a head drive timing signal E2049 according to a mode determined by the CPU E2102. Additionally, the sensor signal processing unit E2022 causes registers to store information concerning the position and the speed of the carriage M4001 obtained from the encoder signal E1020, and then provides such information to the CPU E2102. Subsequently, the CPU E2102 determines various kinds of parameters, which are used for controlling the CR motor E0001, according to this information. Similarly, the sensor signal processing unit E2022 receives an LF encoder sensor signal included in the sensor signal E0104, and causes the register to store information concerning a paper feeding position and a paper feeding speed, and provides such information to the CPU E2102. Then, the CPU E2102 determines various kinds of parameters, which is used for controlling the LF motor E0002, according to this information.

Reference character E2104 designates an A/D converter that converts analog signals, such as a media discriminating sensor output signal and an ink empty sensor output signal, which are included in the sensor signal E0104, an environmental temperature detection thermistor output signal, a reflection type sensor output signal, and a head temperature detection output signal included in the OnCR sensor signal E1105, into signals representing digital values. The A/D converter E2104 transmits such sensor detection information to the CPU E2102 according to a mode determined by the CPU E2102.

The motor control unit E2103 reads a motor drive table (RDPM) E2051 from a motor control buffer E2023 provided on the DRAM E2005, as required, and outputs a motor control signal E1106 under the control of the CPU E2102. In some operating mode, the motor control unit E2103 outputs the motor control signal E1106 using the various sensor detection signals as a control trigger.

Reference character E2105 denotes a panel I/F unit that outputs an LED control signal, which is included in the panel signal E0107, under the control of the CPU E2102. Also, the panel I/F unit E2105 receives a power key state output signal and a resume key state output signal and transmits these signals to the CPU E2102.

Reference character E2029 designates a port control unit that outputs a head power ON signal E1022, a motor power ON signal E1023, and a power control signal E1024 under the control of the CPU E2102.

Configuration of Recording Head

The head cartridge H1000, to which the present embodiment is applied, has a recording head H1001, a unit on which ink tanks H1900 are mounted, and a unit for supplying ink to the recording head H1001 from the ink tank H1900. The head cartridge H1000 is detachably attached to the carriage M4000.

Figure 24:
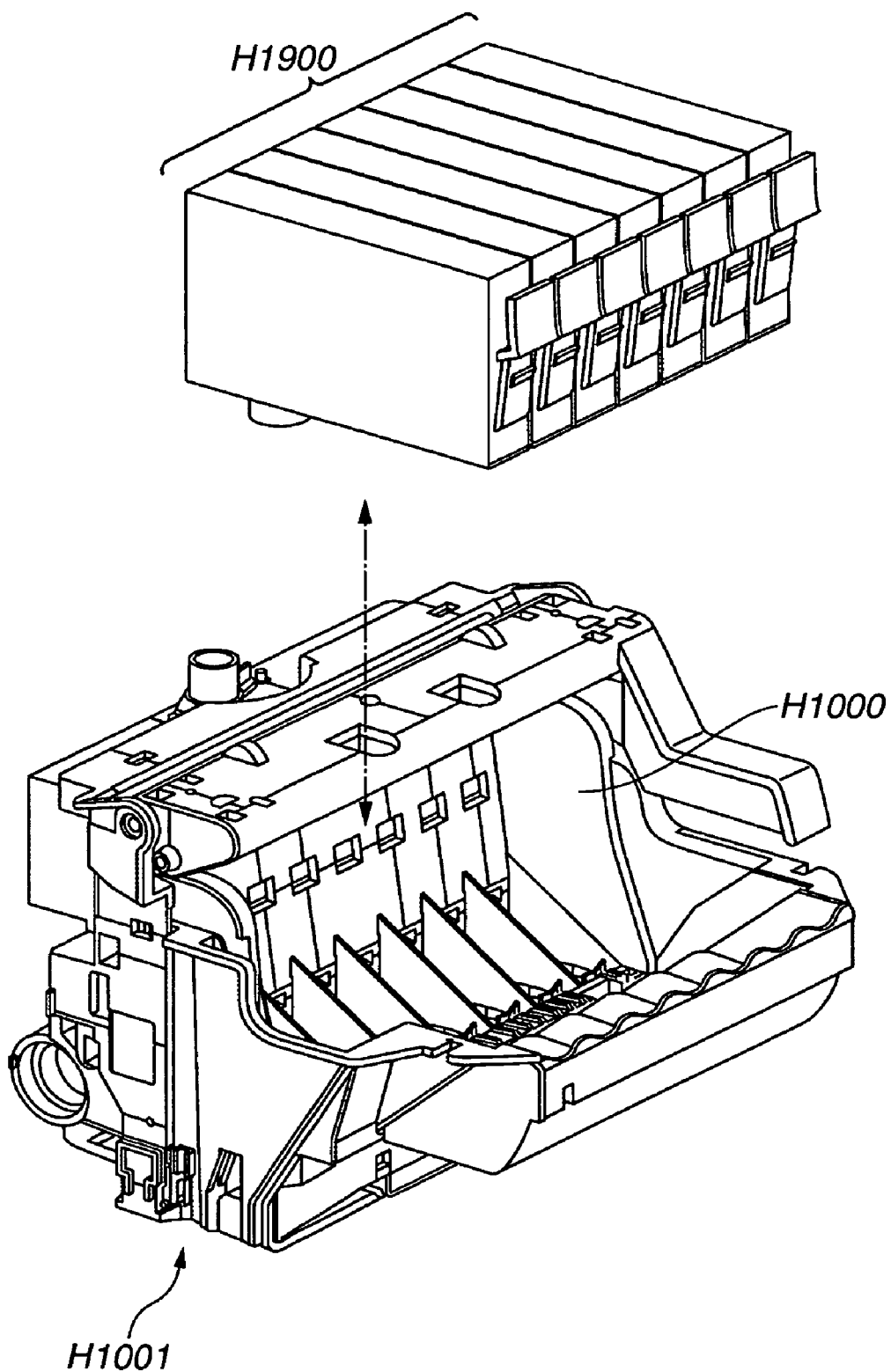
FIG. 24 is a perspective view showing a state in which an ink tank is mounted in a head cartridge to which the embodiment of the invention is applied.

FIG. 24 is a view showing a manner in which the ink tanks H1900 are mounted in the head cartridge H1000 of the present embodiment. The recording apparatus according to the present embodiment is adapted to form an image by using seven colors, that is, cyan, magenta, yellow, black, red, green, and blue. Therefore, the ink tanks H1900 respectively corresponding to the seven colors are prepared independent of one another. As shown in FIG. 24, each of the ink tanks H1900 can be demountably mounted in the head cartridge H1000. Incidentally, the ink tanks H1900 can be mounted and demounted in and from the head cartridge H1000 in a state in which the head cartridge H1000 is mounted on the carriage M4000.

Figure 25:
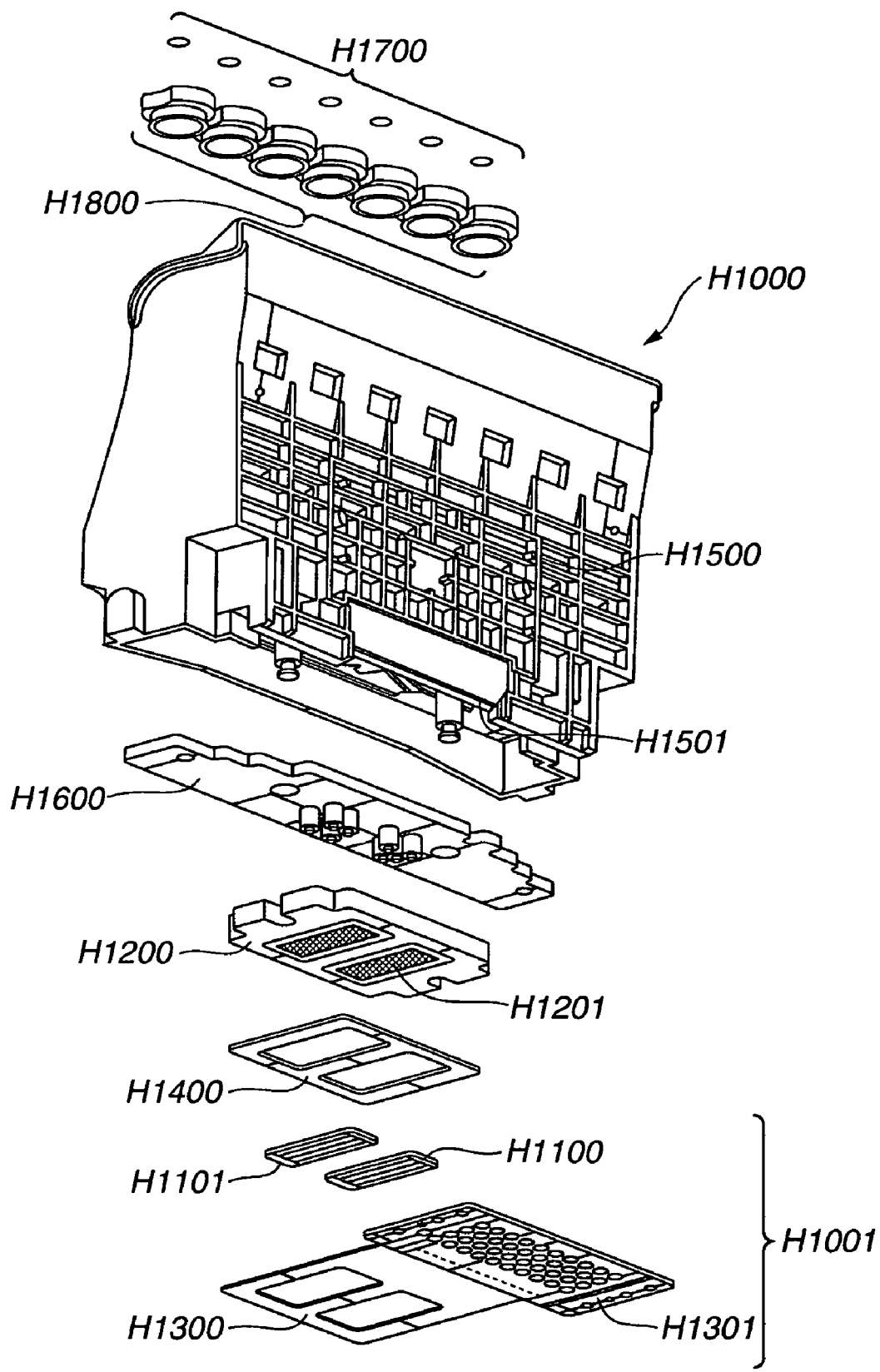
FIG. 25 is an exploded perspective view showing the head cartridge to which the embodiment of the invention is applied.

FIG. 25 is an exploded perspective view of the head cartridge H1000. As shown in FIG. 25, the head cartridge H1000 includes a first recording element circuit board H1100, a second recording element circuit board H1101, a first plate H1200, a second plate H1400, an electric wiring circuit board H1300, a tank holder H1500, a flow path forming member H1600, a filter H1700, and seal rubber members H1800.

Each of the first recording element circuit board H1100 and the second recording element circuit board H1101 is constituted by a Si substrate on one side of which a plurality of recording elements (or nozzles) used to discharge ink is formed by photolithographic techniques. Electric wires, which are made of Al and are used to supply electric power to the recording elements, are formed by deposition techniques. A plurality of ink flow paths respectively corresponding to individual recording elements are also formed by photolithographic techniques. Furthermore, ink supply ports used to supply ink to the plurality of ink flow paths are opened in the back surface of each of the circuit boards H1100 and H1101.

Figure 26:
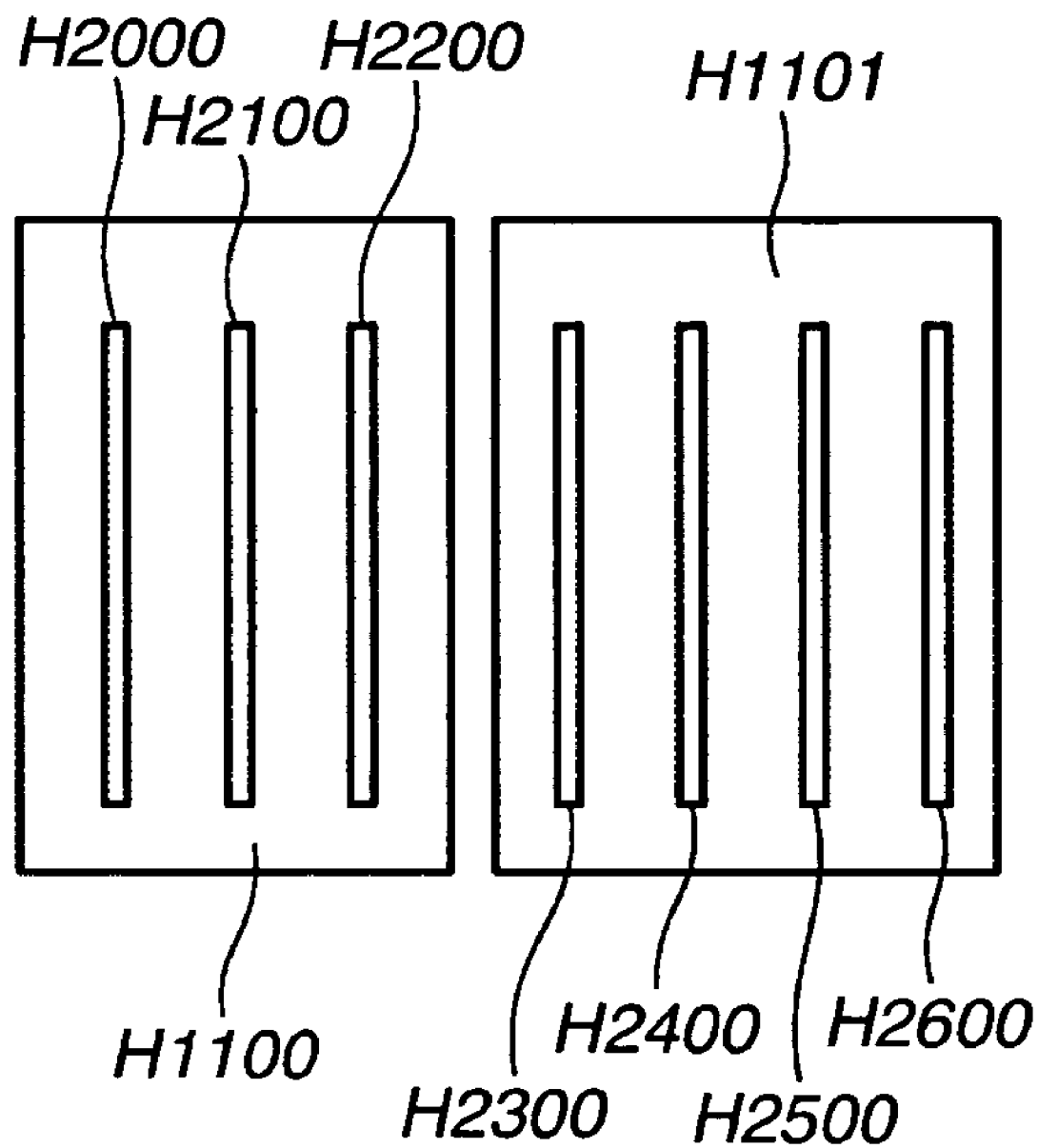
FIG. 26 is a front view showing a recording element substrate in the head cartridge to which the embodiment of the invention is applied.

FIG. 26 is an enlarged front view illustrating the configuration of each of the first recording element circuit board H1100 and the second recording element circuit board H1101. Reference characters H2000 to H2600 denote recording element rows (hereunder referred to also as the nozzle rows) respectively corresponding to different colors of ink. The first recording element circuit board H1100 has nozzle rows respectively corresponding to three colors, that is, a nozzle row H2000 to which cyan ink is supplied, a nozzle row H2100 to which magenta ink is supplied, and a nozzle row H2200 to which yellow ink is supplied. The second recording element circuit board H1101 has nozzle rows respectively corresponding to four colors, that is, a nozzle row H2300 to which black ink is supplied, a nozzle row H2400 to which red ink is supplied, a nozzle row H2500 to which green ink is supplied, and a nozzle row H2600 to which blue ink is supplied.

Each nozzle row has 768 nozzles arranged in the recording medium conveying direction at intervals of 1200 dpi (dot/inch) to discharge ink droplets of about 2 picolitters. The opening space of each nozzle discharge opening is set at about 100 $\mu m^2$. The first recording element circuit board H1100 and the second recording elements circuit board H1101 are fixed to the first plate H1200 by being bonded thereto. Ink supply ports H1201, through which inks are supplied to the first recording element circuit board H1100 and the second recording element circuit board H1101, are formed in the first plate H1200.

The second plate H1400 having openings is fixed to the first plate H1200 by being bonded thereto. The second-rate H1400 holds the electric wire circuit board H1300 to electrically connect the electric wire circuit board H1300, the first recording element circuit board H1100, and the second recording element circuit board H1101 with one another.

The electric wire circuit board H1300 is used to apply an electric signal causing the nozzles, which are formed in the first recording element circuit board H1100 and the second recording element circuit board H1101, to discharge ink. The electric wire circuit board H1300 has electric wires, which correspond to the first recording element circuit board H1100 and the second recording element circuit board H1101, and an external signal input terminal H1301 that is located at an end of the electric wire and receives an electric signal from the main unit of the recording apparatus. The external signal input terminal H1301 is positioned on and is fixed to a rear surface of the tank holder H1500.

Meanwhile, the flow path forming member H1600 is fixed to the tank holder H1500, which holds the ink tanks H1900, by, for example, ultrasonic welding. The flow path forming member H1600 constitutes an ink flow path H1501 that extends from the ink tanks H1900 to the first plate H1200.

The filter H1700 is provided at an ink-tank-side end portion of the ink flow path H1501 engaging with the ink tanks H1900. The filter H1700 can prevent dust from going thereinto. The seal rubber members H1800 are attached to the engaging portion between the ink flow path H1501 and each of the ink tanks H1900 to thereby prevent ink from evaporating from the engaging portion.

Additionally, as described above, the head cartridge H1000 is constituted by connecting a tank holder unit, which includes the tank holder H1500, the flow path forming member H1600, the filter H1700, and the seal rubber members H1800, to the recording head unit H1001, which includes the first recording element circuit board H1100, the second recording element circuit board H1101, the first plate H1200, the electric wire circuit board H1300, and the second plate H1400, by bonding.

Figure 27:
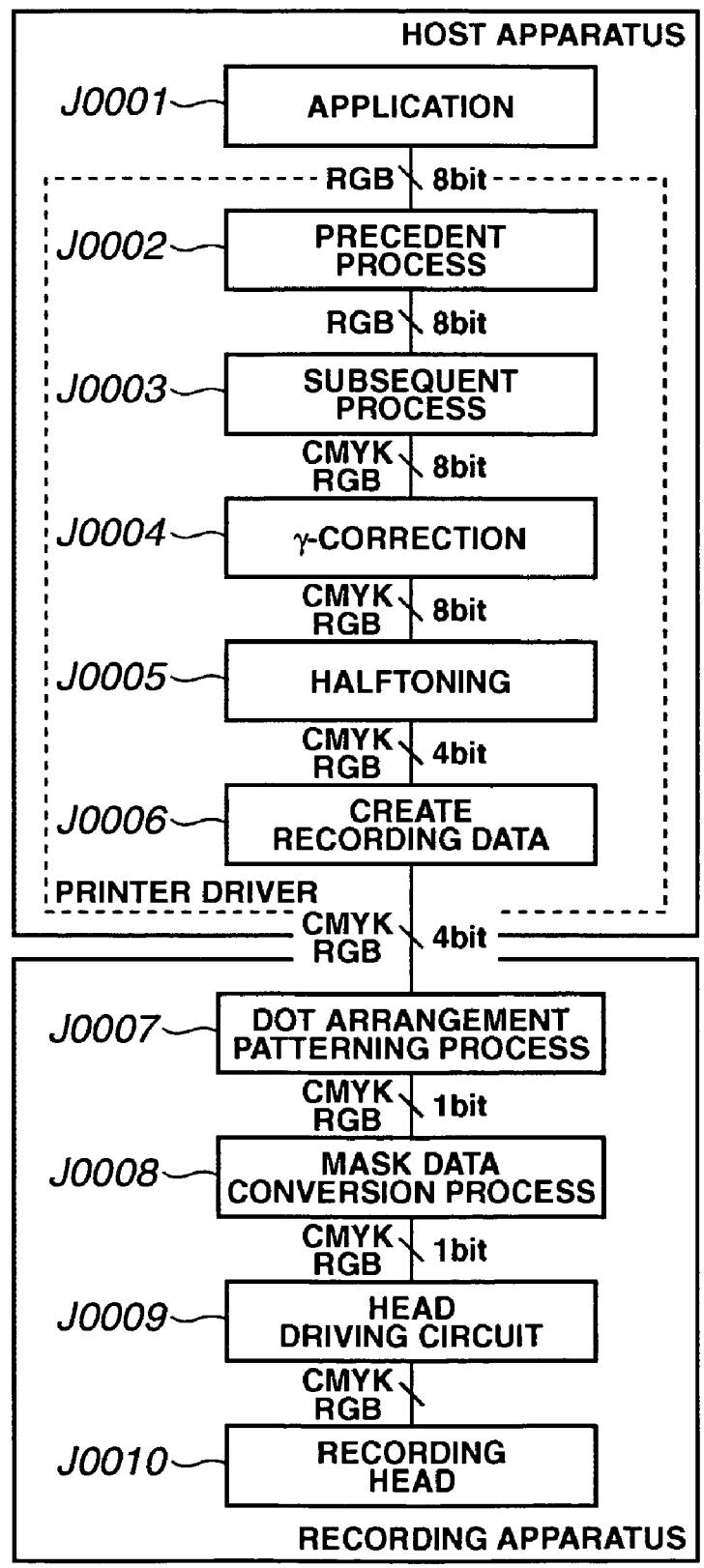
FIG. 27 is a block diagram showing a flow of an image data conversion process in the embodiment of the invention.

FIG. 27 is a block diagram illustrating a flow of an image data conversion process in the present embodiment. The inkjet recording apparatus according to the present embodiment performs recording by using red ink, green ink, and blue ink in addition to ink of fundamental colors, that is, cyan, magenta, yellow, and black. Thus, the recording apparatus according to the present embodiment is provided with recording heads that discharge ink of these seven colors. Each process shown in FIG. 27 is performed by a system including the recording apparatus and a personal computer (PC) that serves as a host apparatus.

Programs executed by an operating system in the host apparatus include an application program and a printer driver. The application program J0001 performs a process of creating image data to be recorded by the recording apparatus. When an image is actually recorded, image data created by executing the application program is transmitted to the printer driver.

The printer driver according to the present embodiment has processes including a precedent process J0002, a subsequent process J0003, γ-correction J0004, halftoning J0005, and recording data creation J0006. Hereinafter, each of the processes J0002 to J0006 is briefly described.

(A) Precedent Process

The precedent process J0002 performs mapping of a gamut. The precedent process J0002 performs data conversion so as to perform mapping of a gamut, which is reproduced using image data R, G, and B conforming to the sRGB standard, into a gamut reproduced by the recording apparatus. Practically, the precedent process J0002 coverts 8-bit image data R, G, B into different 8-bit image data R, G, B by using a three-dimensional LUT (look-up table).

(B) Subsequent Process

The subsequent process J0003 performs a process of obtaining color separation data Y, M, C, K, R, G, and B corresponding to a combination of inks, which reproduces colors represented by the gamut-mapped data R, G, B. This process uses both a three-dimensional LUT and an interpolation operation, similar to the precedent process J0002.

(C) γ-correction

The γ-correction J0004 performs conversion of a grayscale value of each color component data of the color separation data determined by the subsequent process J0003. More specifically, this conversion is performed by using a one-dimensional LUT corresponding to the grayscale characteristic of each color ink in the recording apparatus, so that the color separation data corresponds linearly to the grayscale characteristic of the recording apparatus.

(D) Halftoning

The halftoning J0005 performs a quantization to convert each of 8-bit color separation data Y, M, C, K, R, G, and B into 4-bit data. In the present embodiment, an error diffusion method is used to convert 256-grayscale 8-bit data into 9-grayscale 4-bit data. This 4-bit data represents an index used to designate each arrangement pattern in a dot arrangement patterning process performed in the recording apparatus.

(E) Recording Data Creation Process

The last process performed by the printer driver is the recording data creation process J0006, by which recording data is created by adding recording control information to recording image data including the 4-bit index data. The recording control information includes "recoding medium information", "recording quality information", and "marginless recording designation information". The recording medium information represents a kind of medium subjected to recording, that is, designates one of plain paper, gloss paper, postcard, a printable disk. The recording quality information represents recording quality, that is, designates one of "high-quality", "average", and "high-speed recording quality". In a case where the recording quality information represents "high-quality", recording is performed in a high-quality recording mode in the recording apparatus. In a case where the recording quality information represents "high-speed recording quality", recording is performed in a high-speed recording mode in the recording apparatus. Incidentally, such recording control information is created according to designation made by a user on a UI-screen of a monitor of the host apparatus. The recording image data represents the image data created in the halftoning process J0005. The recording data generated in this way is supplied to the recording apparatus.

The recording apparatus performs a dot arrangement patterning process J0007 and a mask data conversion process J0008 on the inputted recording data.

(F) Dot Arrangement Patterning Process

The dot arrangement patterning process J0007 is described below. In the halftoning process J0005, the number of levels indicated by multi-value density information (8-bit data) representing 256 density levels is lowered to that indicated by 9-level gradation information (4-bit data). However, information actually recordable by the inkjet recording apparatus of the present embodiment is 2-bit information indicating whether to perform recording with ink. In the dot arrangement patterning process J0007, the multi-value level, which ranges from 0 to 8, is lowered to the binary level indicating whether a dot is present. More specifically, in the dot arrangement patterning process J0007, dot arrangement patterns are set to be respectively correspond to the density levels (ranging from 0 to 8) represented by the 4-bit data outputted in the halftoning process J0005 and are allocated to pixels so that the density level of each pixel is equal to the density level corresponding to the dot arrangement pattern allocated thereto. Consequently, it is determined that each of dots corresponding to a plurality of areas in one pixel is on or off. Thus, 1-bit discharge data representing "1" or "0" is placed at each of the areas in one pixel.

Figure 28:
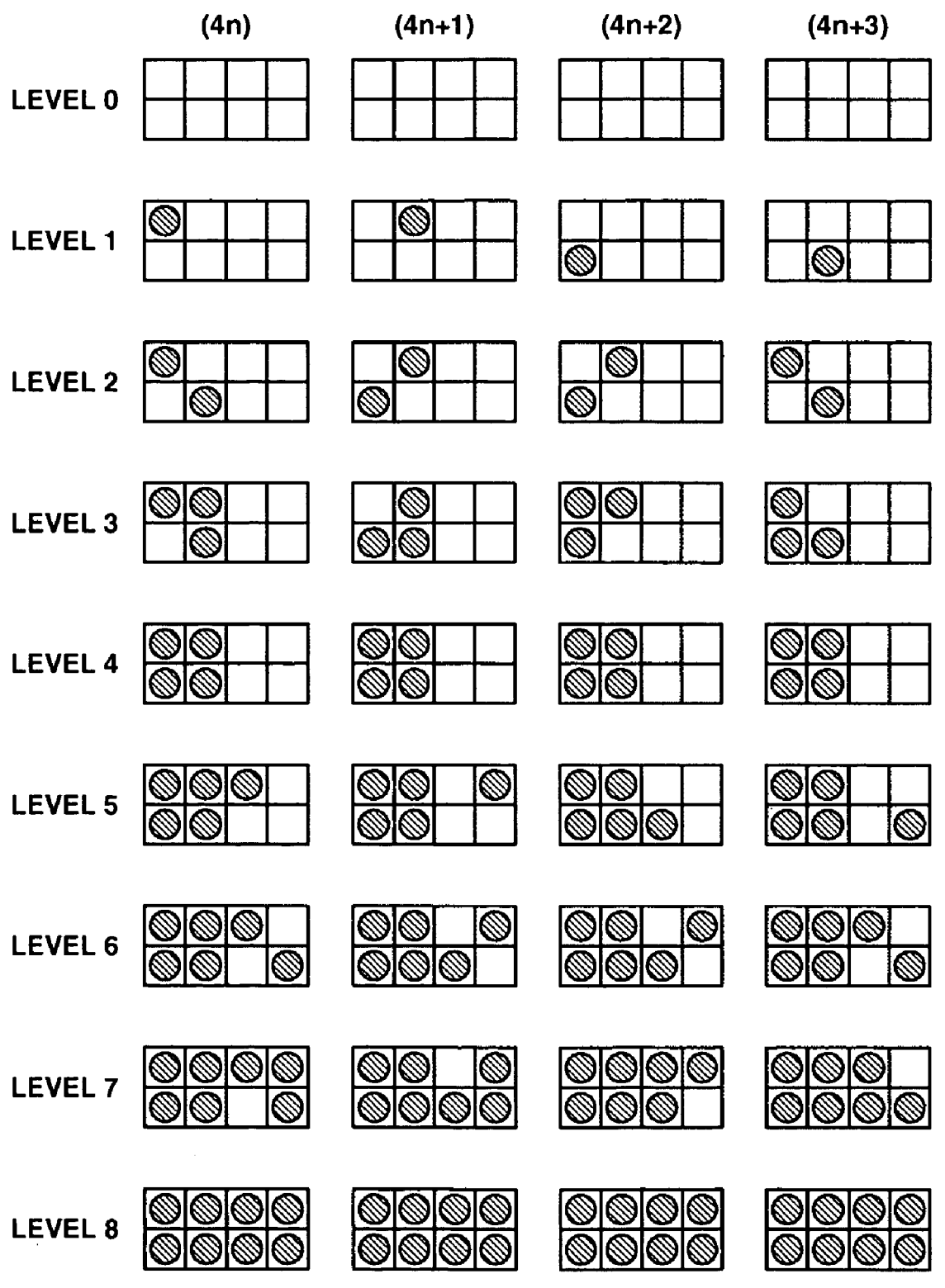

FIG. 28 shows output patterns respectively corresponding to input levels ranging from 0 to 8, which are converted in the dot arrangement patterning process in the high-quality mode in the present embodiment. The level values shown on the left side in FIG. 28 correspond to the levels from 0 to 8 which are values outputted by the halftoning process. Each region formed of 2 areas vertical by 4 areas horizontal, which is on the right side in FIG. 28, corresponds to one pixel area outputted by the halftoning process. The one pixel has a size corresponding to a vertical pixel density and a horizontal pixel density, each of which is 600 ppi (pixel per inch). Each of areas in one pixel corresponds to a minimum unit by which the on/off of a dot is determined, and corresponds to a recording density of 1200 dpi (dot per inch) in the vertical direction and 2400 dpi in the horizontal direction. The recording apparatus according to the present embodiment is designed so that a desired density can be obtained by recording one ink droplet of 2 pl on one area, which is about 20 μm in the vertical direction and about 10 μm in the horizontal direction.

The vertical direction, as viewed in FIG. 28, coincides with the direction in which discharging-openings are arranged in the recording head. Both of the arrangement density of the areas and that of the discharging openings are equal to 1200 dpi. The horizontal direction, as viewed in FIG. 28, coincides with the scanning direction of the recording head. In the high-quality picture mode according to the present embodiment, the recording head performs recording at a density of 2400 dpi.

A dot is recorded on each area, to which a circle is written, in FIG. 28. As the level number increases, the number of recorded dots also increases one by one.

Reference characters (4$n$) to (4$n$+3) (n is an integer equal to or more than 1) denote horizontal pixel positions from the left end of an input image. FIG. 28 shows patterns in the vertical direction corresponding to each of the horizontal pixel position. This means that a plurality of different patterns are provided corresponding to the pixel positions even at the same input level. That is, even in a case where the data, which is outputted from the halftoning unit and has the same level, is inputted, four different dot arrangement patterns, which respectively correspond to the patterns (4$n$) to (4$n$+3) and are shown in the horizontal direction, are cyclically allotted to the pixels on a recording medium. This arrangement has the following effects. That is, the number of times of discharging of ink is divided between the nozzles situated at the top row of the dot arrangement pattern and the nozzles situated at the bottom row. Also, various noises peculiar to the recording apparatus are scattered.

According to the present embodiment, a recorded image reflects the density information on an original image in this manner. Upon completion of performing the dot arrangement patterning process, all of the dot arrangement patterns to be recorded on the recording medium are determined.

(G) Mask Data Conversion Process

The presence/absence of a dot in each area on the recording medium is determined by the dot arrangement patterning process. Thus, when inputting this information without being changed, to a recording head drive circuit J0009, a desired image can be recorded. In this case, what is called one-pass recording is performed. In the one-pass recording, recording on the same scanning region on a recording medium is completed by performing scanning once. However, an example of what is called multi-pass recording is described hereinbelow. In the multi-pass recording, recording on the same scanning region on a recording medium is completed by performing scanning a plurality of times.

Figure 4:
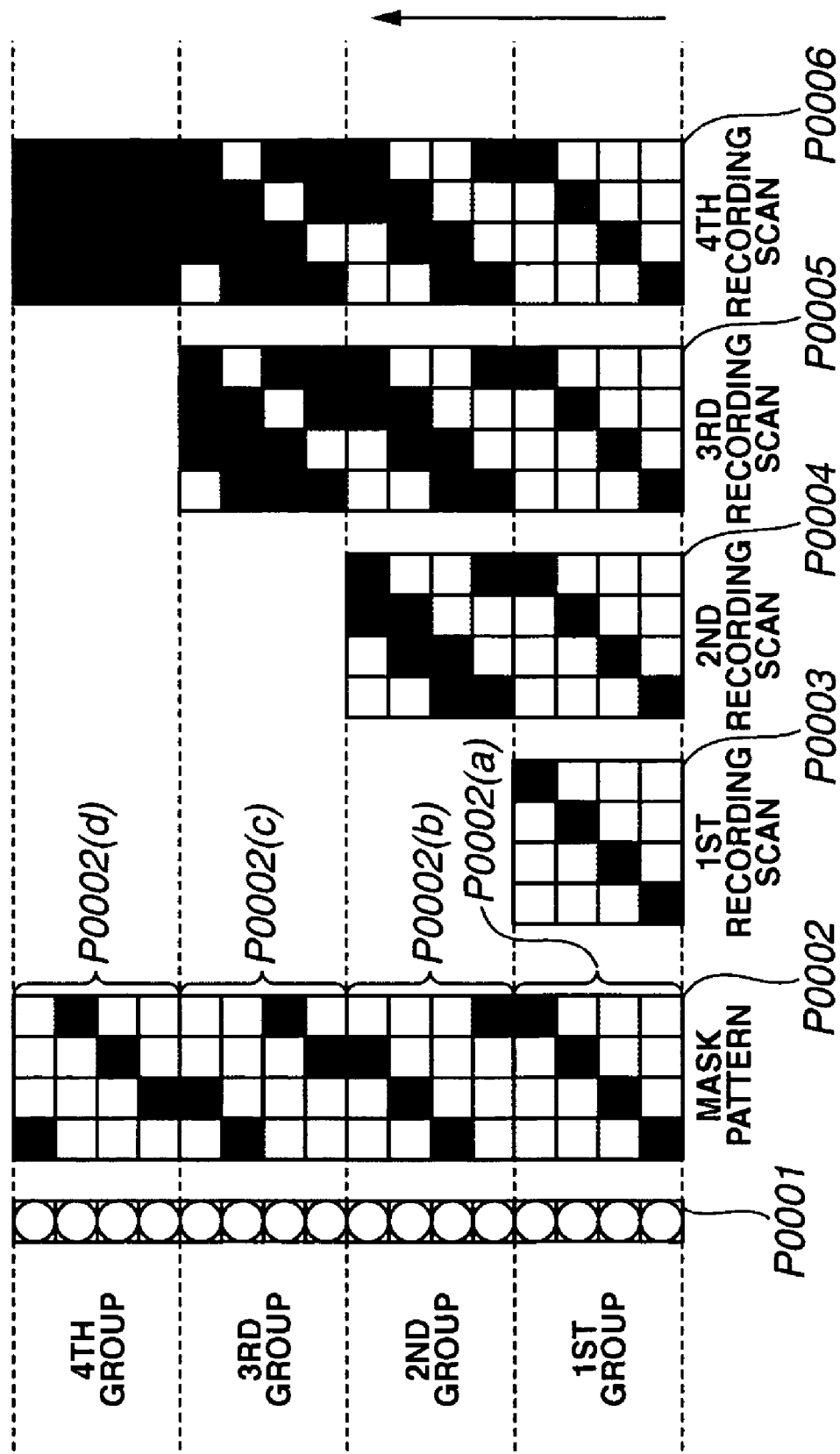
FIG. 4 is a schematic view showing a recording head and a recording pattern so as to describe a multi-pass recording method.

FIG. 4 schematically illustrates a recording head and recording patterns so as to describe a multi-pass recording method. Reference character P0001 denotes the recording head, which is assumed to have only 16 recording elements (or nozzles), for simplicity of description. The nozzles are divided into four nozzle groups, that is, first to fourth nozzle groups, each of which includes four nozzles. Mask patterns P0002 include first to fourth mask patterns P0002(*a*) to P0002(*d*) that define areas, which can be recorded by the first to fourth nozzle groups, respectively. Areas shown in black in the mask patterns are recordable areas, while areas shown in white are non-recordable areas. The first to fourth mask patterns P0002(*a*) to P0002(*d*) are complementary to one another. That is, when these patterns are overlapped, recording of a region formed of 4 areas vertical by 4 areas horizontal is completed.

Patterns P0003 to P0006 show how an image is gradually formed as the recording scan proceeds. Each time one recording scan is finished, a recording medium is conveyed by a distance corresponding to the width of each nozzle group in the direction of an arrow shown in FIG. 4. Thus, an image to be formed on the same area of the recording medium (that is, the area corresponding to the width of each nozzle group) is not completed until four recording scans are performed.

Formation of an image on the same area of the recording medium by performing a plurality of scans using a plurality of nozzle groups, as described above, has an effect of reducing variations peculiar to the nozzles and variations in the recording medium conveying accuracy. Also, countermeasures against other various image problems and problems of reliability of the recording apparatus can be taken by contriving the arrangement of the mask patterns.

For example, the recent inkjet recording head, which is adapted to discharge many small droplets at a high frequency, has a tendency that the discharging direction of a nozzle placed at an end portion of the recording head is inwardly deflected. In this case, a dot formed by the nozzle placed at an end portion of a nozzle row is positioned at a place inwardly deviating from a normal place. Thus, white streaks (hereunder referred to as the "end streaks") may be generated at a pitch equal to the recording width of the recording head. Even in such a situation, the end streaks can be obscured by contriving the arrangement of the mask patterns (see, for example, Japanese Patent Application Laid-Open No. 2002-096455).

Figure 5:
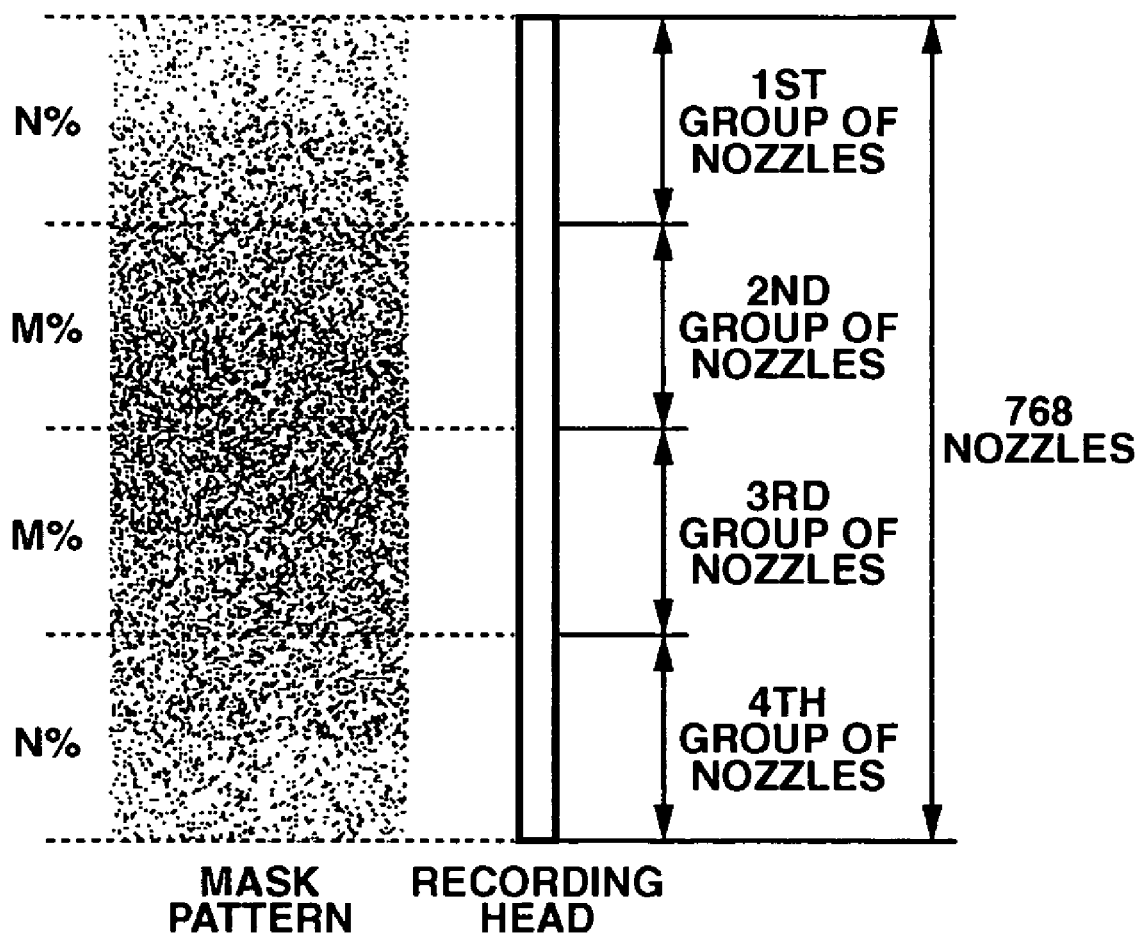
FIG. 5 is a view showing an example of a mask pattern employed so as to reduce an end streak.

FIG. 5 is a view showing an example of a mask pattern employed to reduce the end streaks. Black areas of the mask pattern shown in FIG. 5 serve as the black areas of the mask pattern shown in FIG. 4, and indicate recordable areas. White areas of the mask pattern shown in FIG. 5 serve as the white areas of the mask pattern shown in FIG. 4, and indicate areas on which no recording is permitted. FIG. 5 shows a case in which the recording head having 768 nozzles is used and multi-pass recording using four passes is performed, by way of example. Similarly to the case shown in FIG. 4, all of the 768 nozzles are divided into four nozzle groups. However, as is understood from FIG. 5, the recording rate of the mask pattern (that is, the rate of the number of black areas to the sum of the number of black areas and white areas of the mask pattern) varies with the position of the nozzle group. The recording rate of the mask pattern corresponding to the first nozzle group is N%. The recording rate of the mask pattern corresponding to the second nozzle group is M% (M>N). The recording rate of the mask pattern corresponding to the third nozzle group is M%. The recording rate of the mask pattern corresponding to the fourth nozzle group is N%. A total (N+M+M+N) of the recording rates of the mask pattern, which respectively correspond to the four nozzle groups, is 100%. Thus, while the recording rate of the nozzle group provided at the central portion is set at a relatively high value, the recording rate of the mask pattern gradually becomes lower toward an end portion.

The higher the speed and the density at which the small droplets of ink are recorded, the more notably the inward deflection of the discharging direction occurs. Thus, if the recording rate of the nozzle placed at the end portion is set lower than that of the nozzle placed at the central portion, the tendency of the nozzle, which is placed at the end portion, to inwardly deflect the discharging direction can be mitigated. Even when the discharging direction of the nozzle, which is placed at the end portion, has a tendency to slightly deflect the discharging direction, the number of dots of discharged ink itself is reduced. Consequently, the present embodiment can obtain the effect of obscuring the end streaks due to the deviation of the position at which a dot is formed.

In the present embodiment, data representing the mask patterns shown in FIG. 5 is stored in a memory provided in the main unit of the recording apparatus. In the mask data conversion process J0008, the mask data is ANDed with binary data outputted by the dot arrangement patterning process J0007. Thus, the binary data to be recorded at each recording scan is determined. Then, the binary data is inputted to the drive circuit J0009. Consequently, the recording head H1001 is driven so that ink is discharged according to the binary data.

In the present embodiment, the mask patterns are changed according to the kind of a recording mode (that is, a high-quality recording mode and a high-speed recording mode) and a recording position (that is, a central portion or an end portion) on the recording medium. More specifically, a first mask pattern, which is used to record dots on the central portion of the recording medium, and a second mask pattern, which is used to record dots on an end portion (at least one of a front end portion and a rear end portion) of the recording medium, are provided respectively corresponding to the recording modes. Therefore, the first and second mask patterns used for the high-quality recording mode, and the first and second mask patterns used for the high-speed recording mode are stored in the memory.

(Recording at Front or Rear End Portion of Recording Medium).

The recording apparatus according to the present embodiment can perform "marginless recording", that is, recording of an image without providing a margin at an end portion of the recording medium.

Figure 1:
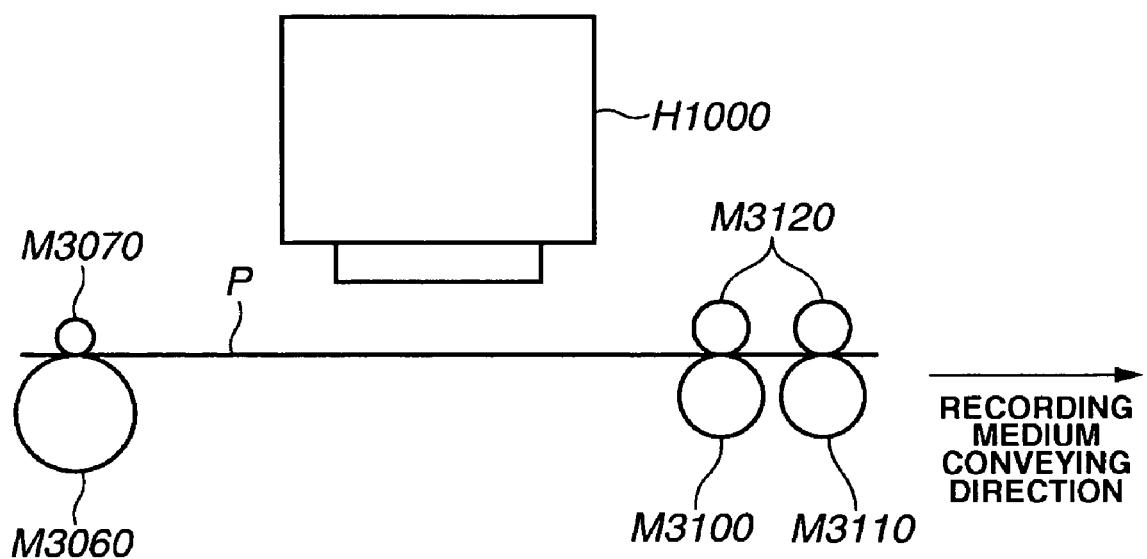
FIG. 1 is a schematic view showing a state in which an image is recorded on a central portion of a recording medium in a conveying mechanism configured to support and convey a recording medium.
Figure 2:
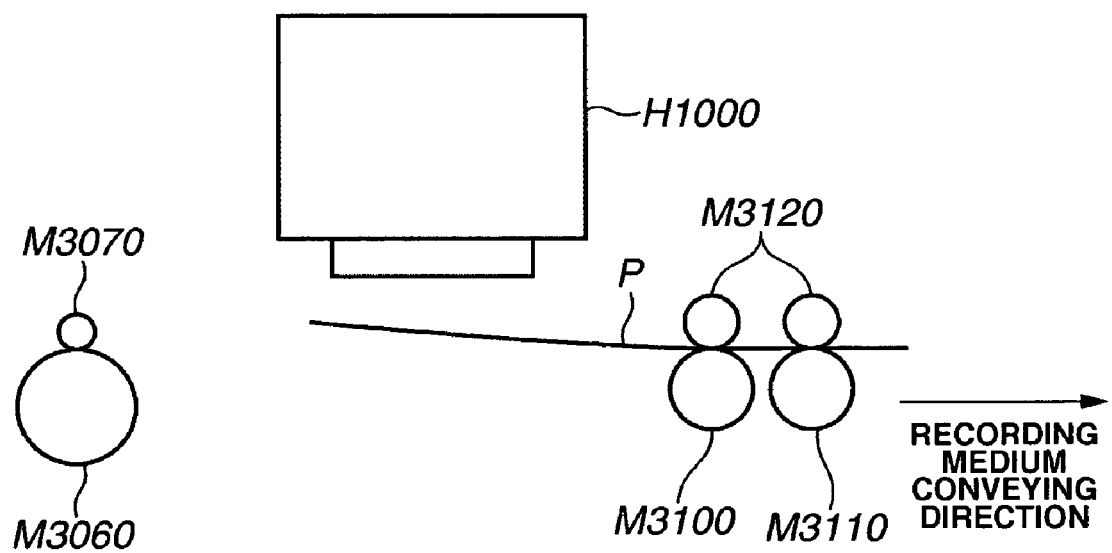
FIG. 2 is a schematic view showing a state in which an image is recorded on the vicinity of a rear end portion of the recording medium in the conveying mechanism configured to support and convey the recording medium.
Figure 3:
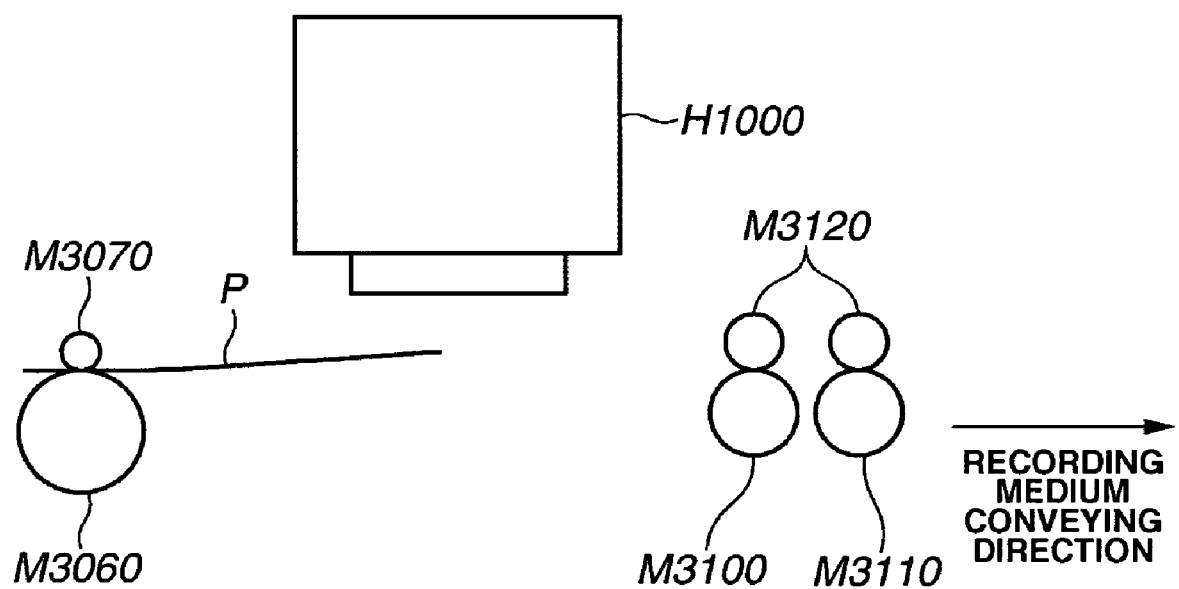
FIG. 3 is a schematic view showing a state in which an image is recorded on the vicinity of a front end portion of the recording medium in the conveying mechanism configured to support and convey the recording medium.
Figure 6:
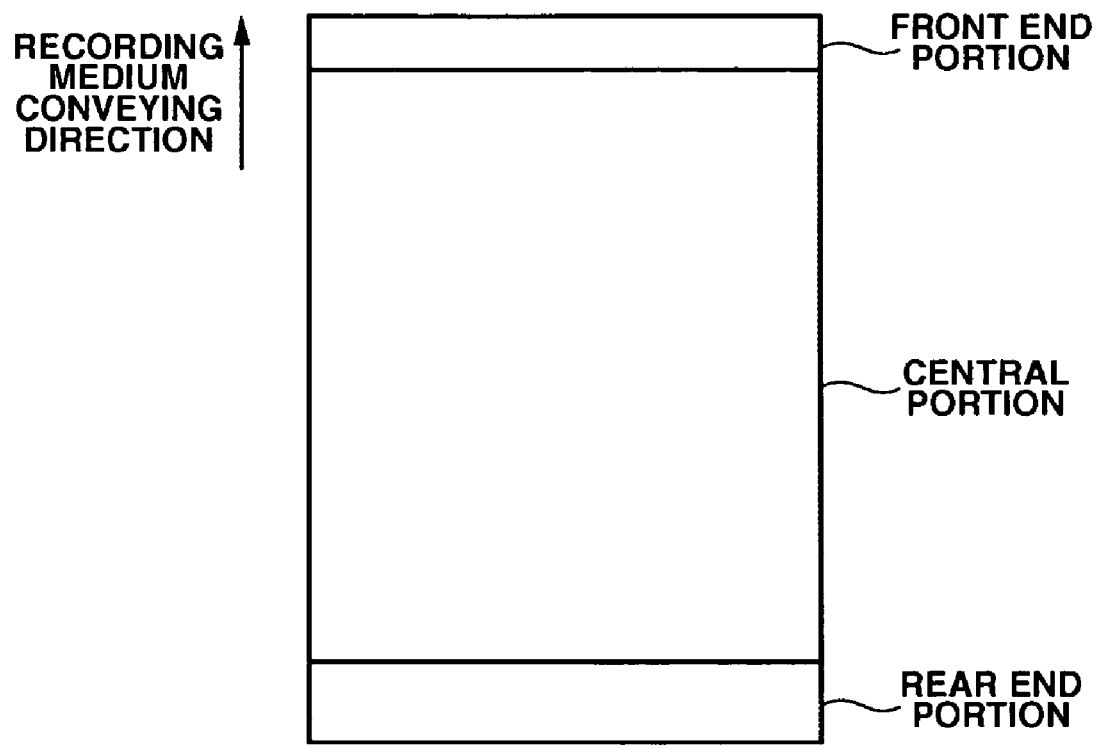
FIG. 6 is a view showing areas of the front end portion, the central portion, and the rear end portion of the recording medium at marginless recording.

FIG. 6 is a view illustrating regions at a front end portion, a central portion, and a rear end portion of a recording medium in a case where marginless recording is performed on the A4 size recording medium in the recording apparatus according to the present embodiment. That is, as described by referring to FIGS. 1 to 3, an area at which recording is performed before a front end of the recording medium is supported by the discharge roller M3100 is defined as a front end portion. An area at which recording is performed after a rear end of the recording medium is disengaged from the conveying roller M3060 is defined as a rear end portion. The area of the recording medium which is other than the front end portion and the rear end potion is defined as a central portion. The central portion is a region at which recording is performed in a state in which the recording medium is held by both the conveying roller M3060 and the discharge roller M3100.

Hereinafter, for description, three kinds of conveying states are defined as follows. That is, a conveying operation in a state in which the recording medium is supported by the conveying roller M3060 and is not supported by the discharge roller M3100 is defined as a first conveying operation. A conveying operation in a state in which the recording medium is supported by both the conveying roller M3060 and the discharge roller M3100 is defined as a second conveying operation. Further, a conveying operation in a state in which the recording medium is not supported by the conveying roller M3060 and is supported by the discharge roller M3100 is defined as a third conveying operation. Strictly in consideration of the conveying operation, which is defined in such a manner, a recording region can be divided into the following five zones in a case where the multi-pass recording is performed, that is, a zone A in which an image is completed by a plurality of passes only through the first conveying operation, a zone B in which an image is completed by a plurality of passes through the first conveying operation and the second conveying operation, a zone C in which an image is completed by a plurality of passes only through the second conveying operation, a zone D in which an image is completed by a plurality of passes through the second conveying operation and the third conveying operation, and a zone E in which an image is completed by a plurality of passes only through the third conveying operation. In an embodiment described below, the zones A and B are set to be the front end portion. The zone C is set to be the central portion. The zones D and E are set to be the rear end portion. Two kinds of the provided mask patterns are applied thereto.

In the present embodiment, recording of an image on the front end portion and the rear end portion is performed by using a part of the nozzles placed at the downstream side (that is, on the discharge-roller side) among the arranged nozzle rows. Therefore, a region treated as the rear end portion is slightly larger than a region treated as the front end portion.

(The Relation between the Recording Rate of the Mask Pattern and the Image Quality)

Hereinafter, a study performed by the inventors of the present invention is described.

Figure 7:
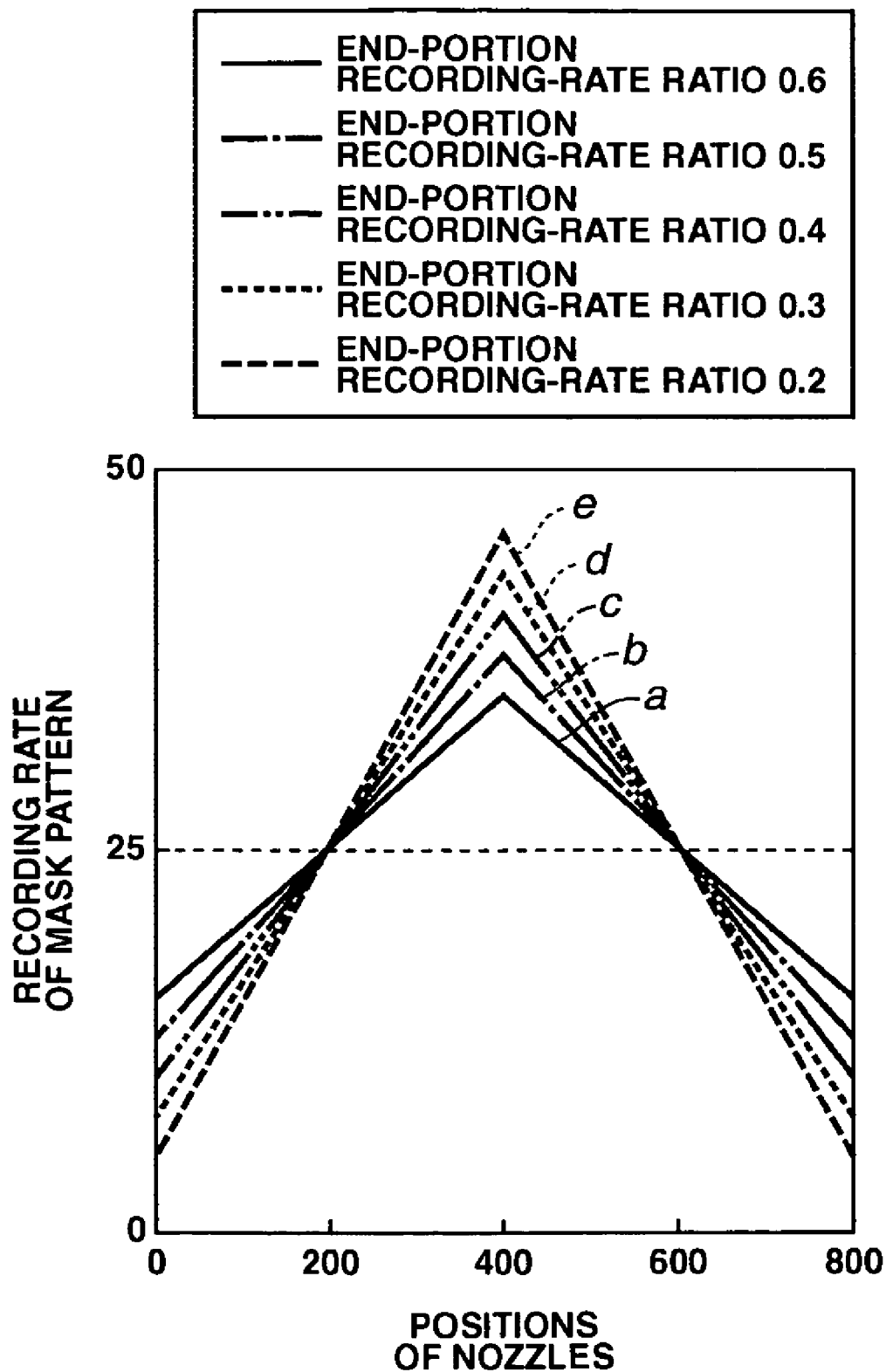
FIG. 7 is a graph showing recording rates of a plurality of mask patterns.

FIG. 7 is a graph showing the recording rates of a plurality of mask patterns made by the inventors. In FIG. 7, the abscissa axis designates the positions of 768 nozzles arranged on the recording head, while the ordinate axis denotes the recording rates of the mask patterns corresponding to each of the nozzles. The inventors of the present invention made five kinds of mask patterns a to e so as to conduct this study. In this study, these mask patterns are applicable to the multi-pass recording using four passes. Thus, the average recording rate of each of the curves a to e is 25%. The average recording rate is represented by (100/K) where K designates the number of passes required to complete an image in the same region.

The recording rate of the mask pattern is defined as a rate in percent of the number of recordable areas (that is, the black areas shown in FIG. 5) to the total number of recordable areas and non-recordable areas (that is, white areas shown in FIG. 5). Hereinafter, this is described more specifically. For instance, it is assumed that the size in the horizontal direction (that is, a direction perpendicular to a direction in which the nozzles are arranged) of the mask pattern shown in FIG. 5 corresponds to 768 areas. Then, the total number of recordable areas and non-recordable areas of the mask pattern corresponding to one nozzle is 768. In a case where the number of the recordable areas are 192 and that of the non-recordable areas is 576 among the 768 areas, the recording rate in percent of the mask pattern corresponding to this nozzle is 25% (=192/768×100%).

Each of all the curves a to e shown in FIG. 7 indicates that the distribution of the recording rate has a highest value at the central portion and has lowest values at the end portions. Among these curves, the curve a indicates the minimum difference between the highest value and the lowest value of the recording rate. In the case of the curve a, the recording rate at the central portion is 35%, while the recording rate at each of both end portions is 15%. Thus, the ratio of the recording rate at the end portion to the average recording rate, which is 25%, is 15/25=0.6. Hereinafter, the ratio of the recording rate at the end portion to the average recording rate is referred to as an end-portion recording-rate ratio.

conversely, the curve e indicates the maximum difference between the highest value and the lowest value of the recording rate. In the case of the curve e, the recording rate at the central portion is 45%, while the recording rate at each of both end portions is 5%. Thus, the ratio of the recording rate at the end portion to the average recording rate, which is 25%, is 5/25=0.2. The curves b to d represent the recording rates of the mask patterns, which are obtained by the uniform internal division of the difference between the recording rates indicated by the curves a and e.

FIG. 8 is a table showing the recording rate at the end portion, the recording rate at the central portion, and the end-portion recording-rate ratio of each of the mask patterns respectively corresponding to the curves a to e shown in FIG. 7. As is seen from FIG. 8, the end-portion recording-rate ratios of the mask patterns respectively corresponding to the curves b, c, and d are 0.5, 0.4, and 0.3.

Figure 9A:
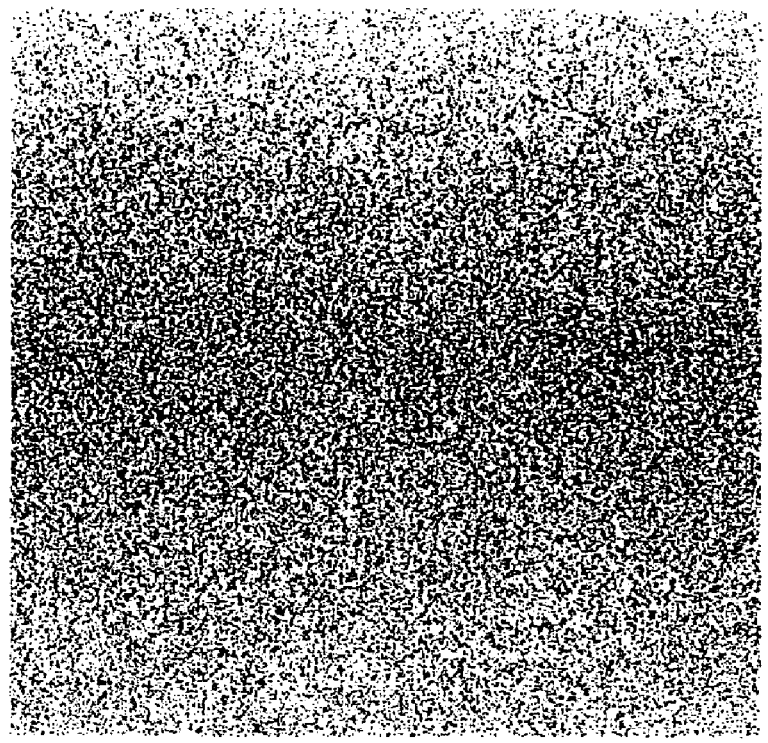
FIGS. 9A and 9B are views showing an example of the mask pattern corresponding to a curve a shown in FIG. 7.
Figure 9B:
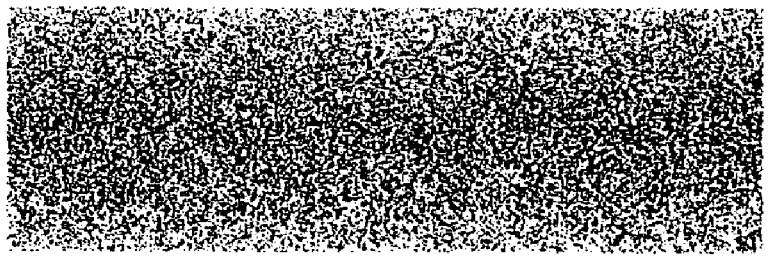

FIG. 9A shows an example of the mask pattern corresponding to the curve a shown in FIG. 7. In FIG. 9A, the vertical direction, as viewed in FIG. 9A, coincides with the direction in which the 768 nozzles are arranged. The recording rate thereof at a central nozzle is 35%, while the recording rate thereof at each of both side end nozzles is 15%. FIG. 9B shows an example of the mask pattern, whose end-portion recording-rate ratio has a value nearly equal to that of the end-portion recording-rate ratio of the mask pattern illustrated in FIG. 9A, in a case where the mask pattern shown in FIG. 9B is used for recording an image by using 256 nozzles. In the case of the mask pattern shown in FIG. 9B, the recording rate thereof at a central nozzle is 35%, while the recording rate thereof at each of both side end nozzles is 15%.

Figure 10A:
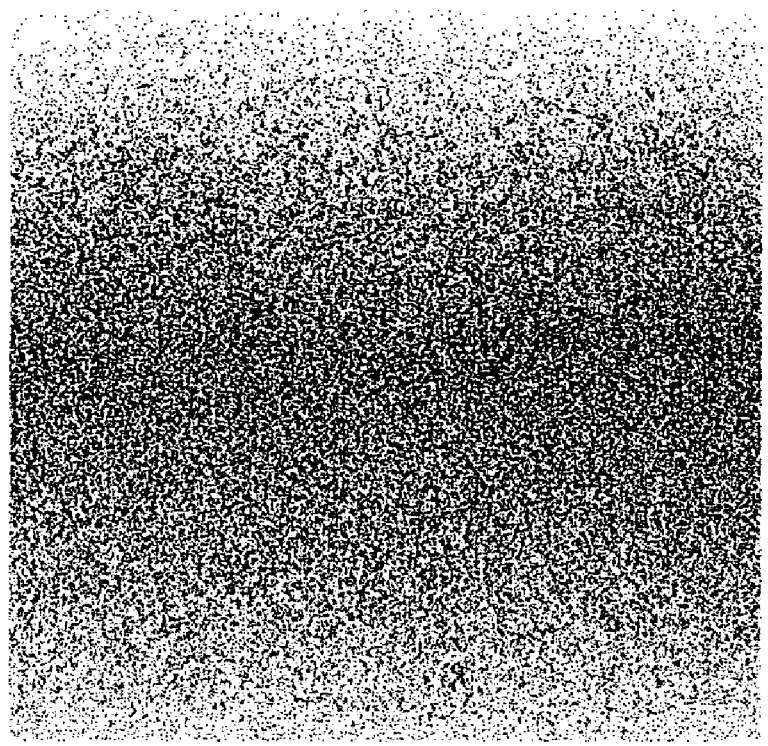
FIGS. 10A and 10B are views showing an example of the mask pattern corresponding to a curve d shown in FIG. 7.
Figure 10B:
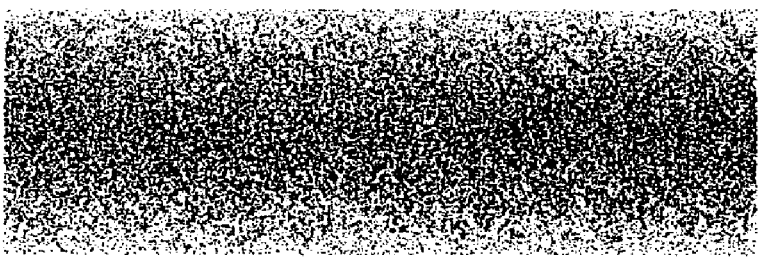

FIG. 10A shows an example of the mask pattern corresponding to the curve d shown in FIG. 7. In FIG. 10A, the vertical direction, as viewed in FIG. 10A, coincides with the direction in which the 768 nozzles are arranged. The recording rate thereof at a central nozzle is 42.5%, while the recording rate thereof at each of both side end nozzles is 7.5%. FIG. 10B shows an example of the mask pattern, whose end-portion recording-rate ratio has a value nearly equal to that of the end-portion recording-rate ratio of the mask pattern illustrated in FIG. 10A, in a case where the mask pattern shown in FIG. 10B is used for recording an image by using 256 nozzles. In the case of the mask pattern shown in FIG. 10B, the recording rate thereof at a central nozzle is 42.5%, while the recording rate thereof at each of both side end nozzles is 7.5%. In the case of both the examples of the mask patterns shown in FIGS. 10A and 10B, the recording rate at the central portion is high, and the recording rate at each of both the end portions is low, as compared with the case of the examples of the mask patterns shown in FIGS. 9A and 9B.

The inventors of the present invention checked the turbulence of an image, which is caused by variation in the amount of a conveyed recording medium, employing the mask pattern for the 256 nozzles, so as to reproduce a recording state at the front and rear end portions. Hereinafter, a method of conducting the study is more specifically described.

In the recording apparatus according to the present embodiment, the nozzles on the recording head are arranged at pitches corresponding to a density of 1200 dpi. Thus, the amount of the recording medium conveyed between the successive recording scans in a case where the multi-pass recording using 4 passes is performed by employing the continuously arranged 256 nozzles is obtained as follows.

25.4 (mm/inch)/1200×256/4≈1.3547 mm.

Then, a plurality of kinds of patterns, which are high in the uniformity of hue, such as gray, were recorded by using the aforementioned mask pattern and by gradually changing the amount of the conveyed recording medium in the vicinity of this value by 1 μm. Thereafter, the inventors estimated the visibility of black streaks, which are generated in a case where the amount of the conveyed recording medium is too small, and white streaks, which are generated in a case where the amount of the conveyed recording medium is too large, by visually observing output images.

Figure 11:
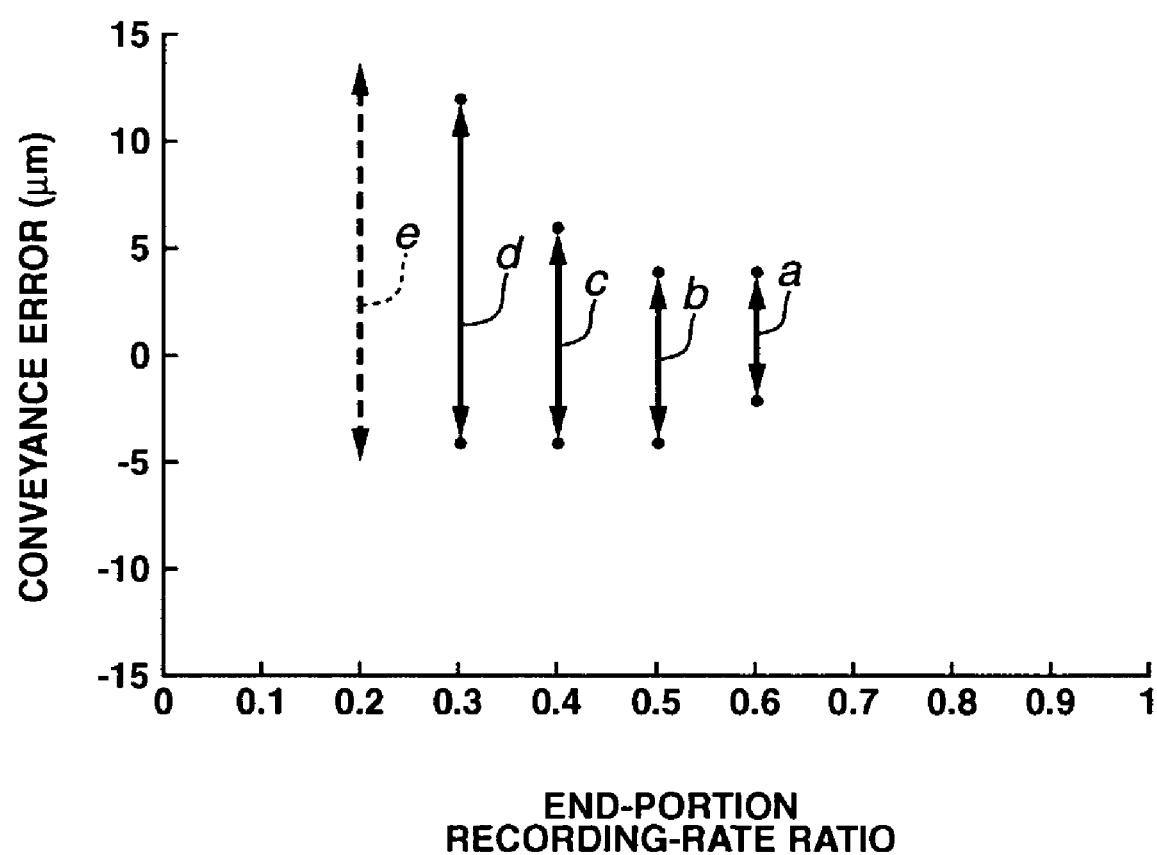
FIG. 11 is a graph showing a result of estimation by visual inspection.

FIG. 11 is a graph illustrating results of the visual estimation. In FIG. 11, the abscissa axis represents the end-portion recording-rate ratios of the mask patterns, while the ordinate axis represents conveyance errors (or amounts of deviation) with respect to normal amounts of the conveyed recording medium. Five double-headed arrows respectively correspond to the five kinds of mask patterns a to e made by the inventors, and indicate the ranges of the allowable conveyance errors. According to FIG. 11, errors whose magnitudes are only about ±3 μm as compared with the normal amount of the conveyed recording medium are tolerable in the case of the mask pattern a having an end-portion recording-rate ratio of 0.6. However, it is confirmed that errors whose magnitudes range from −4 μm to +12 μm as compared with the normal amount of the conveyed recording medium are tolerable in the case of the mask pattern d having an end-portion recording-rate ratio of 0.3. Incidentally, in the case of employing the mask pattern e having an end-portion recording-rate ratio of 0.2, neither white streaks nor black streaks are noticeable over the entire range of errors. Thus, the checked range in the case of the mask pattern e is indicated by a double-headed dashed arrow.

The results show that the less the end-portion recording-rate ratio corresponding to the employed mask pattern becomes (that is, the more leftwardly the employed mask pattern is shown in FIG. 11) among the mask patterns, the less noticeable the white and black streaks become. The white and black streaks due to the variation in the amount of the conveyed recording medium appear in the connecting portion between regions respectively scanned at the recording scans of the recording head, that is, the end portions of the recording region. Thus, it is estimated that the white streaks and black streaks can be obscured in the connecting portion by reducing the recording rate in a region in which deterioration of image quality is most liable to occur, to thereby substantially decrease the possibility of occurrence of the white streaks and black streaks, and by setting the recording rate corresponding to the nozzle group, which covers this region at another recording scan, at a high value. Results of verification conducted by the inventors of the present invention concerning the relation between the end-portion recording-rate ratio (that is, the gradient of each of the mask patterns) and the deterioration of image quality are described below.

FIGS. 29A to 29C and FIGS. 30A to 30C are views illustrating the influence of the end-portion recording-rate ratio upon the quality of an image. In each of these figures, the abscissa axis represents positions on the recording medium, which are located in the conveying direction, in units of pixel, while the ordinate axis represents the recording rates of the mask patterns at the respective positions. This example is implemented in a case where the multi-pass recording employing four passes is performed. At each of the positions, recording is performed by using a plurality of mask patterns indicated by solid lines and dashed lines. A thick solid line shown in an upper part of each of these figures indicates the density of an image at each of the positions on the recording medium. Arrows indicate the positions at which an image is recorded by the recording elements placed at the end portions of the recording element row, that is, the positions of the connecting portions at the recording scan.

Figure 30A:
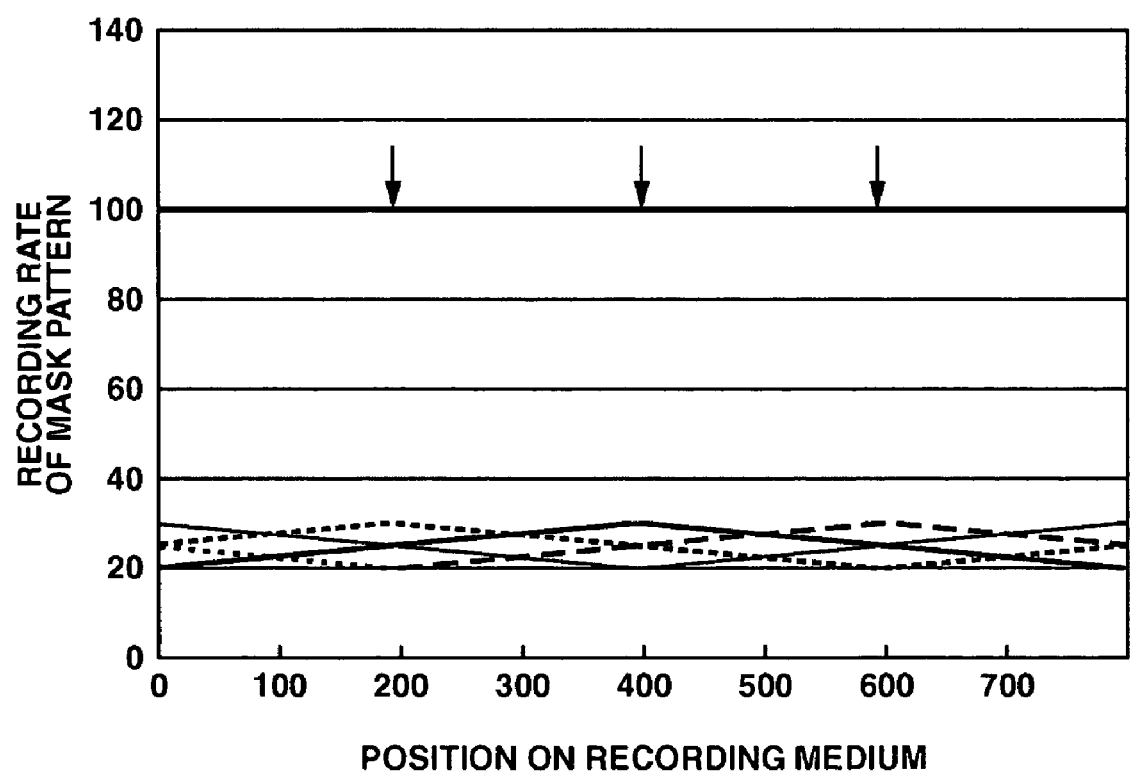
FIGS. 30A to 30C are views showing the influence of end-portion recording-rate ratios on the quality of an image.
Figure 30B:
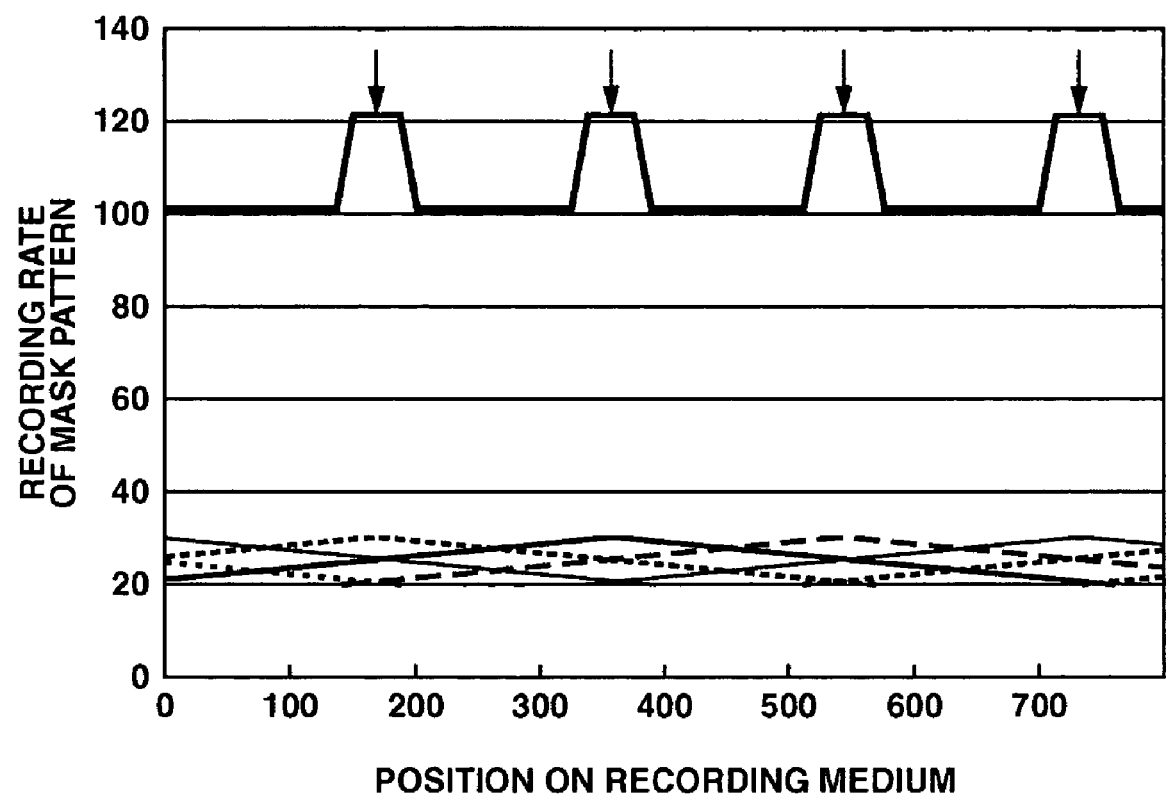
Figure 30C:
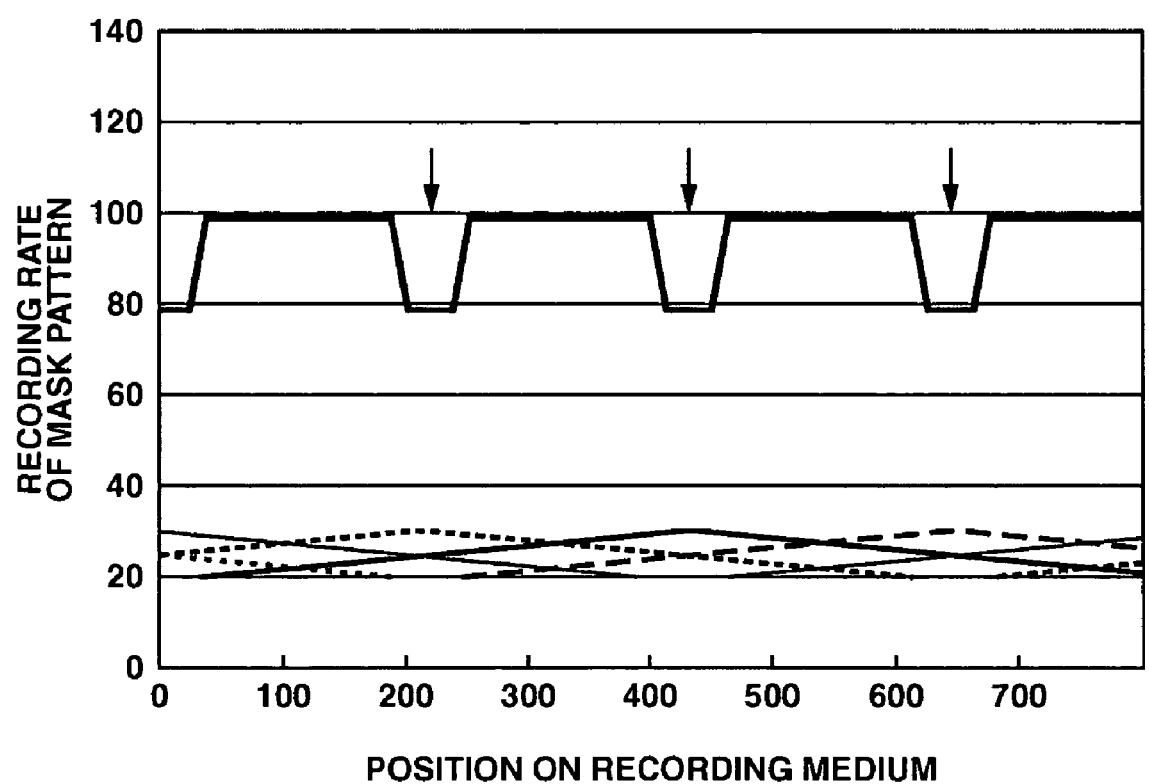

FIGS. 30A to 30C show a state in which black streaks and white streaks are generated in a case where the amount of the conveyed recording medium is set to be less than or more than the normal amount when a mask pattern for four passes having a small gradient of gradation, that is, having a relatively large end-portion recording-rate ratio, is employed. FIG. 30A shows a case where the amount of the conveyed recording medium is the normal amount. In this case, neither black streaks nor white streaks appear on the image. In contrast, FIG. 30B shows a case where the amount of the conveyed recording medium is less than the normal amount. In this case, parts whose densities are higher than other regions appear at the connecting portions designated by arrows. That is, it is confirmed that black streaks appear at the connecting portions. FIG. 30C shows a case where the amount of the conveyed recording medium is more than the normal amount. In this case, parts whose densities are lower than other regions appear at the connecting portions designated by arrows. That is, it is confirmed that white streaks appear at the connecting portions.

Figure 29A:
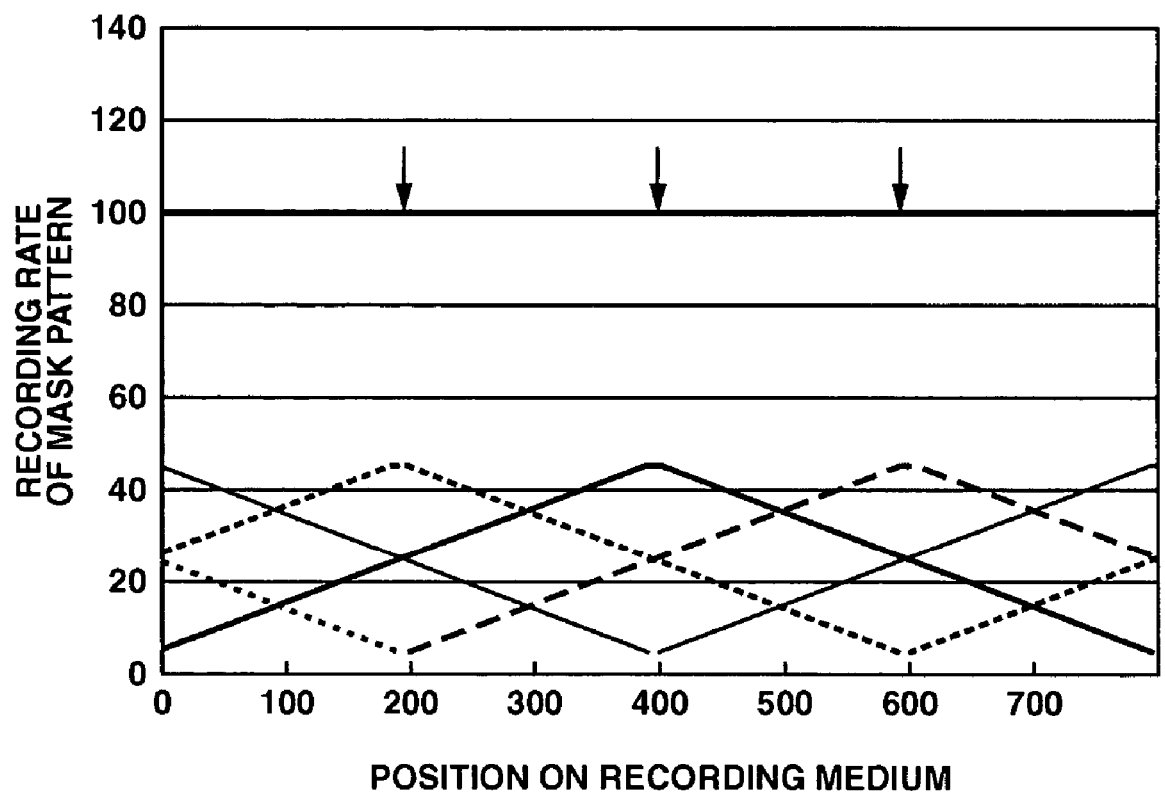
Figure 29B:
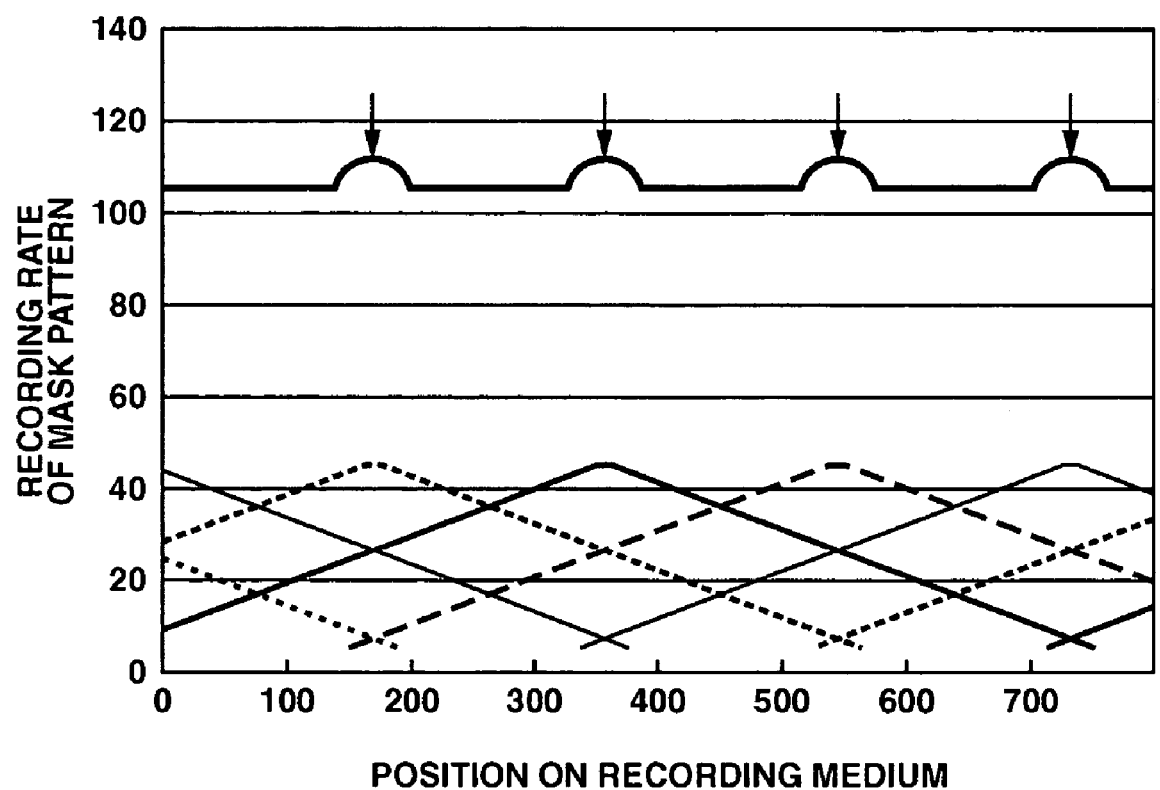

On the other hand, FIGS. 29A to 29C show a state in which black streaks and white streaks are generated in a case where a mask pattern for four passes having a large gradient of gradation, that is, having a relatively small end-portion recording-rate ratio, is employed. FIG. 29A shows a case where the amount of the conveyed recording medium is the normal amount. In this case, neither black streaks nor white streaks appear on the image, similar to the case shown in FIG. 30A. In contrast, FIG. 30B shows a case where the amount of the conveyed recording medium is less than the normal amount. In this case, it is confirmed that black streaks appear at the connecting portions, similar to the case shown in FIG. 30B. However, the black streaks are reduced, as compared with the case shown in FIG. 30B. FIG. 29C shows a case where the amount of the conveyed recording medium is more than the normal amount. In this case, white streaks are reduced, as compared with the case shown in FIG. 30C.

According to the results of the study, it is found that the smaller the end-portion recording-rate ratio of the employed mask pattern becomes, black streaks and white streaks due to the conveyance errors are less noticeable. On the other hand, it is confirmed that the smaller the end-portion recording-rate ratio of the employed mask pattern becomes, the more frequently the high density part appears at the central portion, at which the recording rate of the mask pattern is high, of the recording region at one recording scan in the actually observed image. More specifically, although the presence of this band-like uneven density part is not confirmed in the case of using the mask pattern a having a large end-portion recording-rate ratio, that of the band-like uneven density part is slightly confirmed in the case of using the mask pattern b. There is a tendency that as the end-portion recording-rate ratio becomes gradually smaller from the value corresponding to the mask pattern c to that corresponding to the mask pattern e, the presence of the band-like uneven density part gradually becomes more clearly noticed.

Although mechanisms causing such phenomena are not clearly described, it is confirmed that when there is extreme unevenness in the recording rate among the nozzles of the row, a substantial difference in the discharging performance among the nozzles is caused due to the unevenness of the temperature distribution and to the difference in the discharging frequency. Also, the ink droplets may be connected to one another on the recording medium depending upon the density of ink droplets discharged to the recording medium at the recording scan before the ink droplets infiltrate the recording medium and are fused thereinto. This maybe a cause of occurrence of the high density part.

In addition, an intrinsic gradation mask as disclosed in Japanese Patent Application Laid-Open No. 2002-096455 obtains effects of preventing an occurrence of an end deflection and obscuring end streaks by maintaining the distribution of the recording rate like a smooth curve. However, when the recording rate varies extremely largely, for instance, in the case of using the mask pattern e, such effects cannot be sufficiently obtained. It is preferable from the viewpoint of the service life that the recording rate is set to be uniform as much as possible among a plurality of nozzles of the inkjet recording head.

According to the results of the study, the inventors of the present invention have found that it is advantageous for reducing white streaks and black streaks, which are generated due to the conveyance errors, to use a mask pattern having a small end-portion recording-rate ratio (that is, a mask pattern having a large gradient), and that, conversely, when white streaks and black streaks are not noticeable, it is advantageous to use a mask pattern having a large end-portion recording-rate ratio (that is, a mask pattern having a small gradient).

(Configuration of Recording Modes)

In view of the results of the study, the following description is given of a case where the marginless recording is performed in two modes, that is, a high-speed recording mode in which an image is outputted by giving importance to a recording speed, and a high-quality recording mode in which an image is outputted by giving importance to the quality of the image. As is apparent from the following description, in the high-quality recording mode, the number (64) of nozzles used to record an image on the front end portion and the rear end portion is reduced, as compared with the number (768) of nozzles used to record an image on the central portion. The rate of the reduction ((768−64)/768=11/12) is set at a relatively large value. Thus, the recording width corresponding to one scan is set at a relatively small value. Accordingly, high-quality recording is achieved. On the other hand, in the high-quality recording mode, although the number (256) of nozzles used to record an image on the front end portion and the rear end portion is reduced, as compared with the number (768) of nozzles used to record an image on the central portion, the rate of the reduction ((768−256)/768=2/3) is set at a relatively small value. Thus, the recording width corresponding to one scan is set at a relatively large value. Accordingly, high-speed recording is achieved.

FIG. 12A is a graph illustrating the distribution of the recording rate of a mask pattern employed at the central portion of the recording medium in the high-speed recording mode according to the present embodiment. In this case, it is assumed that the multi-pass recording using four passes is employed. Thus, the mask pattern indicated by the curve a shown in FIG. 7 is applied to this case. That is, among all of 768 nozzles, the recording rate at the nozzle at the endmost portion is 15%. The recording rate at the nozzle at the central portion is 35%. The end-portion recording-rate ratio is 0.6.

FIG. 12B shows the case of using a mask pattern in a state in which the number of nozzles used for recording is limited to 128 while maintaining the recording rates and the end-portion recording-rate ratio at the same values as used in the case shown in FIG. 12A. Conventionally, the mask pattern generally applied to the front end portion and to the rear end portion has the end-portion recording-rate ratio almost equal to that of the mask pattern applied to the central portion.

FIG. 12C shows the case of using a mask pattern applied to the front end portion and the rear end portion in the high-speed recording mode in the present embodiment. In this case, the number of nozzles for use in recording is set at 256, which is twice that of nozzles used in the conventional case. Further, the mask pattern having the recording rate distribution as that of the mask pattern corresponding to the curve d shown in FIG. 7 is applied. That is, the recording rate at the nozzle at the central portion is 42.5%. The recording rate at the nozzle at the endmost portion is 7.5%. The end-portion recording-rate ratio is 0.3.

Referring again to FIG. 11, the smaller the end-portion recording-rate ratio becomes, the wider the permissible range of the conveyance error becomes. The permissible range of the conveyance error in the case of the mask pattern corresponding to the curve d, which has an end-portion recording-rate ratio of 0.3, is twice or more that of the conveyance error in the case of the mask pattern corresponding to the curve a, which has an end-portion recording-rate ratio of 0.6. Thus, the recording width, that is, the number of nozzles used to recording an image, is set to be twice that of nozzles used in the case shown in FIG. 12B. Consequently, even when the amount of the conveyed recording medium is set to be twice and when the recording time is reduced to half, the similar quality of an image as in the conventional case can be maintained.

Figure 13A:
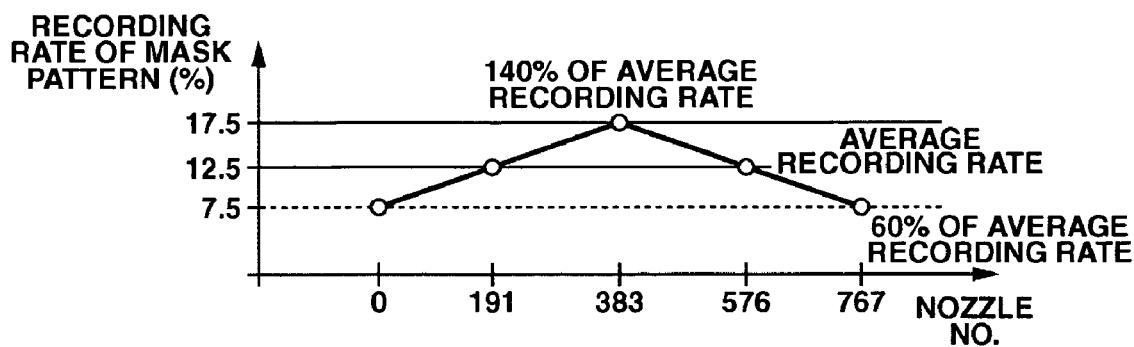
FIG. 13A to 13c are graphs showing the distributions of the recording rates of the mask patterns applied in the embodiment of the invention, and a comparative example.

FIG. 13A is a graph illustrating the distribution of the recording rate of a mask pattern employed at the central portion of the recording medium in the high-quality recording mode according to the present embodiment. In this case, it is assumed that the multi-pass recording using eight passes is employed so as to enhance the quality of an image still more. Among all of 768 nozzles, the recording rate at the nozzle provided at the endmost portion is 7.5%. The recording rate at the nozzle provided at the central portion is 17.5%. Thus, as compared with the case of the high-speed recording mode, the recording rate is reduced to half, as a whole. On the other hand, the end-portion recording rate-ratio is 0.6, similar to the case of the high-speed recording mode.

Figure 13B:
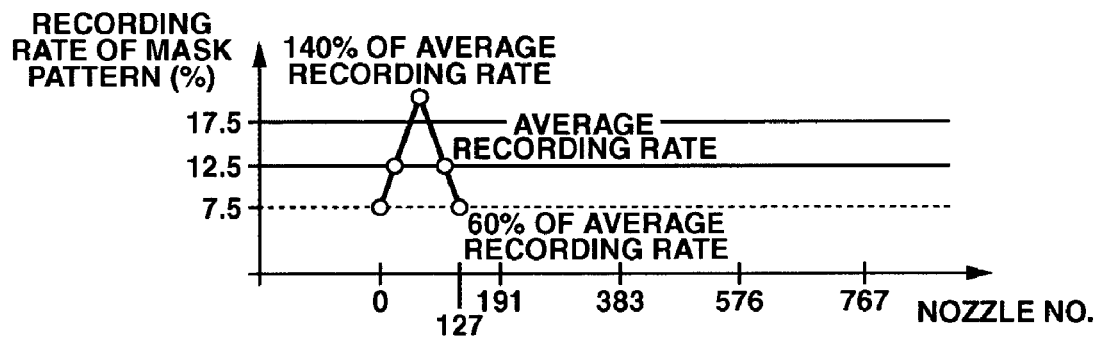

FIG. 13B shows the case of a comparative example using a mask pattern in a state in which the number of nozzles used for recording is limited to 128 while maintaining the recording rates and the end-portion recording-rate ratio at the same values as used in the case shown in FIG. 13A.

Figure 13C:
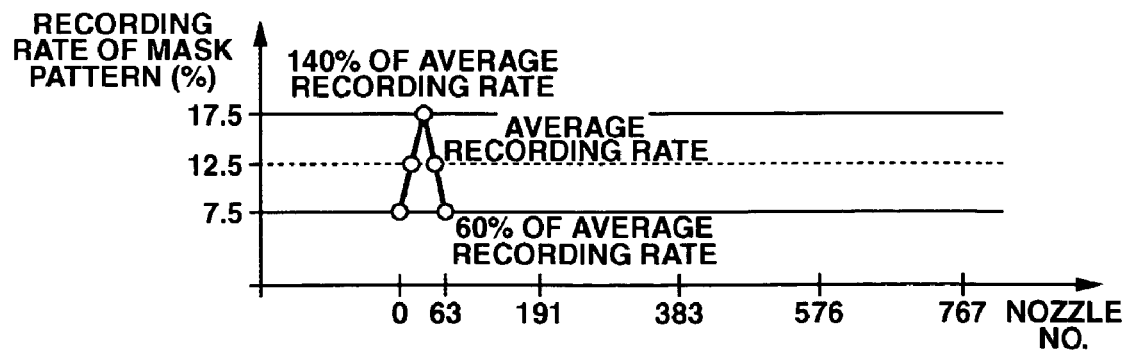

FIG. 13C shows the case of using a mask pattern applied to the front end portion and the rear end portion in the high-quality recording mode in the present embodiment. In this case, the number of nozzles for use in recording is set at 64, which is half that of the nozzles for use in recording in the comparative example shown in FIG. 13B. The recording rate at the nozzle at the central portion and that at the nozzle at each of the endmost portions are 17.5% and 7.5%, respectively, which are the same as those in the case shown in FIG. 13B. The end-portion recording-rate ratio of the mask pattern corresponding to FIG. 13C is 0.6. As previously described, the cause of the turbulence of an image at the front end portion and the rear end portion is not only the variation in the amount of the conveyed recording medium but the instability of the head-paper distance, which degrades the quality of an image. In the high-quality recording mode in the present embodiment, the number of nozzles for use in recording is reduced so as to suppress the influence of the variation in the head-paper distance as much as possible. This effect is more specifically described below.

Figure 14A:
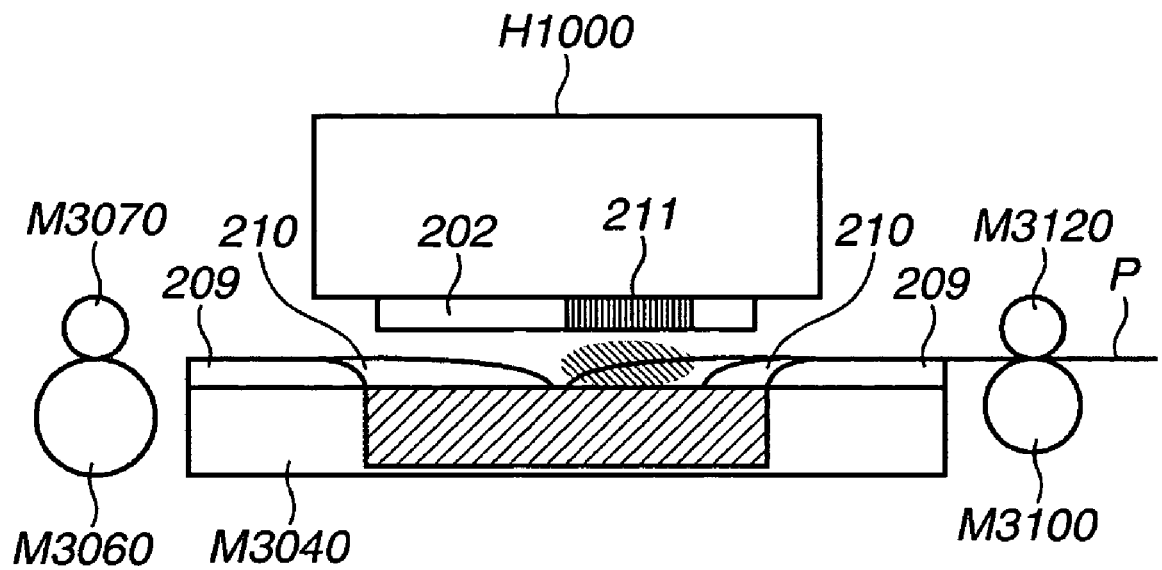
FIGS. 14A and 14B are schematic views each showing a nozzle area and a head-paper distance in a high-speed mode and a high-quality mode, respectively.
Figure 14B:
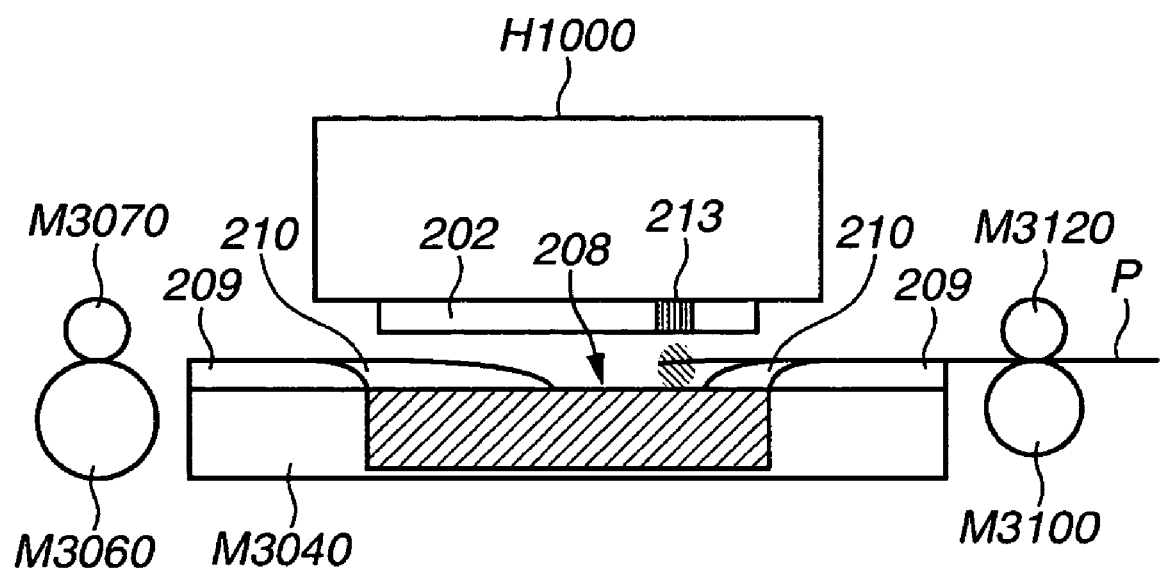

FIGS. 14A and 14B are schematic views showing the relation between the nozzle region (the number of nozzles for use in recording) and the head-paper distance in the high-speed recording mode and the high-quality recording mode, respectively, in the present embodiment.

In FIGS. 14A and 14B, reference character H1000 designates a recording head. Reference numeral 202 denotes a nozzle region, in which 768 nozzles are disposed, on the recording head H1000. Reference character M3060 designates a conveying roller used to convey a recording medium. Reference character M3070 denotes a pinch roller that sandwiches the recording medium together with the conveying roller M3060 and coveys the recording medium with high conveying accuracy. Reference character M3100 designates a discharge roller used mainly to discharge the recording medium. Reference character M3120 denotes a spur that supports the recording medium when the recording medium is discharged.

Reference character M3040 designates a platen that supports the recording medium passing through a recording region. Reference numeral 208 denotes a groove provided in the platen M3040 to collect ink that outwardly runs off the endmost portion of the recording medium. An ink absorber indicated by hatching is provided in the groove 208. Ink absorbed into the ink absorber is moved to a waste ink absorber (not shown) provided at the lower portion of the main unit of the recording apparatus.

Reference numeral 209 designates a part of a rib attached to the platen M3040. When marginless recording is performed, discharged ink runs off the recording medium not only from the front and rear end portions thereof but from the lateral end portions thereof. The distance between an upstream rib 209 placed on the left side, as viewed in FIGS. 14A and 14B, and a downstream rib 209 placed on the right side is larger than the length corresponding to the maximum number (768 in the present embodiment) of nozzles for use in recording at the lateral end portions. Also, reference numeral 210 denotes a part of the rib attached to the platen M3040. The distance between an upstream rib 210 placed on the left side, as viewed in FIGS. 14A and 14B, and a downstream rib 210 placed on the right side is larger than the length corresponding to the maximum number (256 in the present embodiment) of nozzles for use in recording at the front and rear end portions of the recording medium.

FIG. 14A shows a state in which recording is performed on the rear end portion of the recording medium P in the high-speed recording mode. Reference numeral 211 designates a recording region corresponding to 256 nozzles for use in recording at the rear end portion. Generally, it is known that after the recording medium P comes off the conveying roller M3060, the rearmost end portion of the recording medium P is bent, as illustrated in FIG. 14A. The degree of bending the rearmost portion is affected by the recording environment, the material of the recording medium P, and the recording duty of an image. However, more or less, the bending of the rearmost portion occurs. The head-paper distance between the head and the recording region 211 abruptly changes in the rearmost region. The degree of bending and the variation in the head-paper distance are changed according to whether the rearmost end portion of the recording medium P is placed on the rib 210. In a case where the rearmost end portion of the recording medium P is placed at a relative large distance from the downstream side rib 210, which supports the recording medium, as shown in FIG. 14A, the degree of bending the rearmost end portion of the recording medium P is large, and the head-paper distance largely exceeds the normal distance. On the other hand, in a case where the rearmost end portion of the recording medium P is relatively near to the downstream side rib 210, which supports the recording medium, as shown in FIG. 14B, the degree of bending the rearmost end portion of the recording medium P is small, and the variation in the head-paper distance from the normal distance is small. That is, the deterioration of the quality of an image due to the variation in the head-paper distance can be suppressed by maintaining a state in which recording can be performed by using a part of the nozzles close to the downstream side rib 210, as much as possible.

In the high-quality recording mode in the present embodiment, among all of 768 nozzles, 64 nozzles closest to the downstream side rib 210 are used as a recording region 213, as indicated in FIG. 14B. Consequently, even in the case of recording at the rear end portion, the head-paper distance is maintained at a favorable value. Also, the number of passes used in the multi-pass recording is 8. Thus, the amount of the recording medium conveyed at each recording scan becomes a value corresponding to 64/8=8 nozzles, which is very small. Consequently, the errors caused by the conveyance of the recording medium are reduced still more. Hence, high-quality marginless recording can be realized. However, as the amount of the recording medium conveyed at each recording scan is reduced, the number of times of the recording scans is increased. Thus, the recording time is increased.

In contrast, in the high-speed recording mode illustrated in FIG. 14A, 256 nozzles are used even in the case of recording at the rear end portion, and four passes are employed in the multi-pass recording. Thus, the amount of the recording medium conveyed at each recording scan corresponds to 256/4=64 nozzles. Even in the case of recording at the rear end portion, the recording speed is 8 times that in the high-quality recording mode. However, even the nozzles placed further away from the rib 210 supporting the recording medium are used for recording. Therefore, degradation of the quality of an image due to the variation in the head-paper distance cannot be prevented. However, in the high-speed recording mode, as described with reference to FIGS. 12A to 12C, the recording rate of a mask pattern corresponding to the nozzles provided at the end portion, which are used for recording at the rear end portion (see FIG. 12A), is reduced, as compared with the recording rate of a mask pattern corresponding to the nozzles used for recording at the central portion (see FIG. 12A). Thus, the frequency of occurrence of a deviation of the position which discharged ink reaches from a position at which a dot is to be formed is reduced. Accordingly, the degree of deterioration of an image at the rear end portion is suppressed, as compared with the conventional case.

As described above, the present embodiment has two recording modes, which differ in the purpose from each other, and performs recording on the front end portion and the rear end portion of the recording medium according to an appropriate method in each of the recording modes. When recording an image, users can select one of the recording modes in consideration of the importance of each of the image quality and the recording speed.

Figure 15:
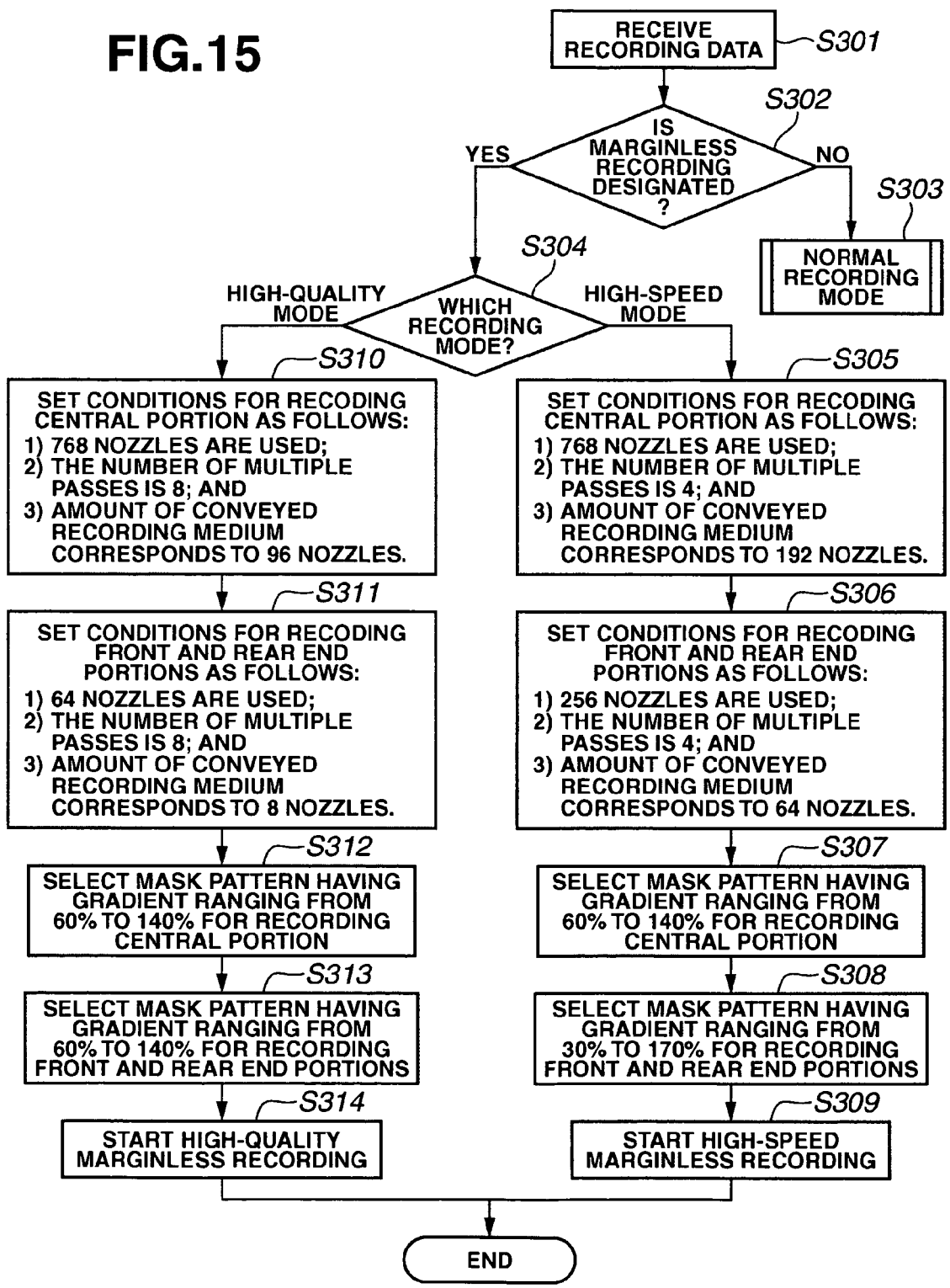
FIG. 15 is a flowchart showing a process of determining a recording method in an inkjet recording apparatus applicable to an embodiment of the invention.

FIG. 15 is a flowchart showing a process of determining one of recording methods respectively corresponding to the recording modes, which differ from each other in the recording quality and the recording time, in the present embodiment.

First, in step S301, the recording apparatus receives recording data, as described with reference to FIG. 27. This recording data includes the recording control information, which is set by a user in the printer driver, in addition to the image data (referred to also as the recording image data) created by the halftoning process J0005, as described with reference to FIG. 27. The recording control information includes, for example, marginless recording designation information representing whether marginless recording is performed, and recording quality information designating which of the high-quality mode and the high-speed mode is employed to record an image.

Upon completion of reception of the recording data, the process proceeds to step S302, where it is determined whether this recording is marginless recording. If not, the process proceeds to step S303, where a margin is provided at each of the end portions of the recording medium, and an operation in a normal recording mode is performed to record an image.

If it is determined in step S302 that the marginless recording is performed, the process proceeds to step S304, where it is determined which of the high-quality mode and the high-speed mode the recording mode is.

If it is determined in step S304 that the recording mode is the high-speed mode, the process proceeds to step S305, where the conditions for recording at the central portion of the recording medium are set. That is, the number of nozzles for use in recording is set at 768. The number of passes is set at 4. The amount of the conveyed recording medium is set at an amount corresponding to 192 nozzles.

Subsequently, the process proceeds to step S306, where the conditions for recording at the front end portion and the rear end portion of the recording medium are set. That is, the number of nozzles for use in recording is set at 256. The number of passes is set at 4. The amount of the conveyed recording medium is set at an amount corresponding to 64 nozzles.

Then, the process proceeds to step S307, where a mask pattern which is used when recording is performed on the central portion is selected. In this case, the mask pattern shown in FIG. 12A is selected.

Subsequently, the process proceeds to step S308, where a mask pattern which is used when recording is performed on the front end portion and the rear end portion is selected. In this case, the mask pattern shown in FIG. 12C is selected.

Further, the process proceeds to step S309, where the marginless recording is performed in the high-speed mode. After that, this process is finished.

On the other hand, if it is determined in step S304 that the recording mode is the high-quality mode, the process proceeds to step S310, where the conditions for recording at the central portion of the recording medium are set. That is, the number of nozzles for use in recording is set at 768. The number of passes is set at 8. The amount of the conveyed recording medium is set at an amount corresponding to 96 nozzles.

Subsequently, the process proceeds to step S311, where the conditions for recording at the front end portion and the rear end portion of the recording medium are set. That is, the number of nozzles for use in recording is set at 64. The number of passes is set at 8. The amount of the conveyed recording medium is set at an amount corresponding to 8 nozzles.

Then, the process proceeds to step S312, where a mask pattern which is used when recording is performed on the central portion is selected. In this case, the mask pattern shown in FIG. 13A is selected.

Subsequently, the process proceeds to step S313, where a mask pattern which is used when recording is performed on the front end portion and the rear end portion is selected. In this case, the mask pattern shown in FIG. 13C is selected.

Then, the process proceeds to step S314, where the marginless recording is performed in the high-quality mode. After that, this process is finished.

As described above, the present embodiment has two recording modes, which differ in the purpose from each other, and performs recording on the front end portion and the rear end portion of the recording medium according to an appropriate method in each of the recording modes. When recording an image, a user can select one of the recording modes in consideration of the importance of each of the image quality and the recording speed. Consequently, the user can be prevented from wasting the recording time against the user's intention. Also, the user can be prevented from obtaining an image whose quality is unexpectedly low. Thus, a satisfactory output of an image can be realized.

Although the marginless recording method has been described as the recording method employed in the recording apparatus according to the present embodiment, the recording method according to the present invention is not limited to the marginless recording method. The degradation of the image quality may occur at the front end portion or the rear end portion of an image even in a case where the image has a margin, as described with reference to FIGS. 1 to 3. Regardless of whether the marginless recording is performed, such problems may occur in various manners according to the positional relation between the recording region and each of the conveying roller, the discharge roller, and the recording head, the positional accuracy thereof, and the kind of the recording medium. The present invention is effective in dealing with a situation in which the problem of degradation of the image quality occurs at the front and rear end portions of the recording medium, at a desired recording speed with desired image quality, irrespective of the main causes of the problem.

In the foregoing description of the invention, the same mask pattern is applied to the recording of an image on the front end portion and the rear end portion of the recording medium. The present invention is not limited thereto. The conditions, such as the number of nozzles and the kind of the mask pattern, applied to the rear end portion, the conveying accuracy of which is expected to be lowered, may be different from those applied to the front end portion, the conveying accuracy of which is expected to be less lowered as compared with the rear end portion.

The forms of the mask patterns (that is, the arrangements of the recordable areas thereof) according to the present invention are not limited to the gradation masks shown in FIGS. 12A to 12C and 13A to 13C. The present invention is effective by employing, for example, a mask pattern whose recordable areas are arranged so that the recording rates respectively corresponding to the passes are uniform, as shown in FIG. 4, or, a mask pattern having a random arrangement of recordable areas, as disclosed in Japanese Patent Application Laid-Open No. 2002-144522.

In the foregoing description of the embodiment, the multi-pass recording using four passes or eight passes is performed. The multi-pass recording may employ passes the number of which is more than or less than 4 and 8. The present invention can obtain sufficient effects by performing recording in a plurality of recording modes to achieve the purposes thereof.

In the foregoing description of the embodiment, the recording apparatus has an inkjet recording head adapted to discharge ink droplets. However, the recording system of the present invention is not limited thereto. The present invention can obtain advantages by using any recording system, as long as the recording system has a recording head which has a plurality of recording elements and is provided between at least two rollers, such as the conveying roller and the discharge roller described with reference to FIGS. 1 to 3, adapted to convey the recording medium so that an image can be formed on the front end portion, the central portion, and the rear end portion of the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-251078 filed Aug. 30, 2004, which is hereby incorporated by reference herein in its entirety.

What is claimed is:

1. A recording apparatus configured to record an image on a recording medium by repeating a recording operation and a conveying operation, the recording operation being operative to apply a recording agent to the recording medium using a recording head while scanning the recording head in a direction different from a predetermined direction, the recording head including a plurality of recording elements arranged in the predetermined direction and adapted to apply the recording agent, the conveying operation being operative to convey the recording medium in a direction transverse to the scanning direction, the recording apparatus comprising:

a recording control unit configured to perform the recording operation such that a number of the recording elements which are used to record an image on at least one of a front end portion and a rear end portion of the recording medium is reduced at a rate as compared to that of the recording elements which are used to record an image on a central portion of the recording medium; and a recording mode selecting unit configured to select a recording mode from a plurality of recording modes differing from one another in at least one of recording quality and recording time, wherein the recording control unit changes the rate of reduction according to the recording mode selected by the recording mode selecting unit.

2. A recording apparatus according to claim 1, wherein the plurality of recording modes includes a first recording mode and a second recording mode, the second recording mode having a recording time taken to record the image longer than that taken to record the image in the first recording mode, and wherein the recording control unit reduces the number of the recording elements used to record an image on the end portion of the recording medium such that the rate of reduction is smaller when the first recording mode is selected than when the second recording mode is selected.

3. A recording apparatus according to claim 2, further comprising:

a determination unit configured to determine on which of the central portion and the end portions an image is recorded; and a storage unit configured to store mask patterns used to distribute image data which corresponds to a same region on the recording medium to a plurality of times of the scanning, wherein the storage unit stores a first mask pattern which is used to record an image on the central portion, and a second mask pattern which is used to record an image on the at least one of the front end portion and the rear end portion, corresponding to each of the first and second recording modes, and wherein the recording control unit determines a mask pattern, which is read from the storage unit, according to a result of determination by the determination unit and to a result of selection by the recording mode selecting unit.

4. A recording apparatus according to claim 3, wherein the first mask pattern and the second mask pattern are configured such that, among the plurality of recording elements for use in recording, a recording rate of an end recording element is less than a recording rate of a central recording element.

5. A recording apparatus according to claim 4, wherein in the first recording mode, a recording rate of the second mask pattern corresponding to the end recording element is less than a recording rate of the first mask pattern corresponding to the end recording element.

6. A recording apparatus according to claim 3, further comprising:

a first conveying unit placed at an upstream side from the recording head and configured to support and convey the recording medium; and a second conveying unit placed at a downstream side from the recording head and configured to support and convey the recording medium, wherein the determination unit determines, when the recording medium is supported and conveyed only by the first conveying unit, that an image is recorded on the front end portion, determines, when the recording medium is supported and conveyed by the first conveying unit and the second conveying unit, that an image is recorded on the central portion, and determines, when the recording medium is supported and conveyed only by the second conveying unit, that an image is recorded on the rear end portion.

7. A recording apparatus according to claim 1, wherein the recording operation is an operation to record an image on at least one of the front end portion and the rear end portion of the recording medium without providing a margin thereon.

8. A recording apparatus according to claim 3, wherein the second mask pattern includes a front second mask pattern which is used to record an image on the front end portion, and a rear second mask pattern which is used to record an image on the rear end portion, the front second mask pattern being different from the rear second mask pattern.

9. A recording apparatus configured to perform marginless recording to record an image on a recording medium without providing a margin on an end portion of the recording medium, using a recording head including a plurality of recording elements arranged in a predetermined direction and adapted to apply a recording agent to the recording medium, the recording apparatus comprising:

a first recording control unit configured to record an image on a central portion of the recording medium by using recording elements of the recording head while scanning the recording head in a direction different from the predetermined direction;

a second recording control unit configured to record an image on a front end portion and a rear end portion of the recording medium by using recording elements the number of which is less than that of the recording elements used to record an image on the central portion of the recording medium while scanning the recording head in the direction different from the predetermined direction; and a recording mode selecting unit configured to select a recording mode from a plurality of recording modes differing from one another in at least one of recording quality and recording time, wherein a ratio between the number of the recording elements used by the first recording control unit and the number of the recording element used by the second recording control unit is changed according to the recording mode selected by the recording mode selecting unit.

10. A recording method for forming an image on a recording medium by repeating a main scanning operation and a subscanning operation, the main scanning operation being operative to scan a recording head in a direction different from a predetermined direction, the recording head including a plurality of recording elements arranged in the predetermined direction and adapted to apply a recording agent to the recording medium, the subscanning operation being operative to convey the recording medium in a direction transverse to the scanning direction, the recording method comprising:

a first recording step of recording an image on a central portion of the recording medium by using recording elements of the recording head during the main scanning operation;

a second recording step of recording an image on at least one of a front end portion and a rear end portion of the recording medium by using recording elements the number of which is less than that of the recording element used in the first recording step, during the main scanning operation; and a recording mode selecting step of selecting a recording mode from a plurality of recording modes differing from one another in at least one of recording quality and recording time, wherein a ratio of the number of the recording elements used in the second recording step to the number of the recording elements used in the first recording step is changed according to the recording mode selected in the recording mode selecting step.

11. A recording method for performing marginless recording to record an image on a recording medium without providing a margin on an end portion of the recording medium, using a recording head including a plurality of recording elements arranged in a predetermined direction and adapted to apply a recording agent to the recording medium, the recording method comprising:

a first recording control step of recording an image on a central portion of the recording medium by using recording elements of the recording head while scanning the recording head in a direction different from the predetermined direction;

a second recording control step of recording an image on at least one of a front end portion and a rear end portion of the recording medium by using recording elements the number of which is less than that of the recording elements used in the first recording control step while scanning the recording head in the direction different from the predetermined direction; and a recording mode selecting step of selecting a recording mode from a plurality of recording modes differing from one another in at least one of recording quality and recording time, wherein a ratio between the number of the recording elements used in the first recording step and the number of the recording element used in the second recording control step is changed according to the recording mode selected in the recording mode selecting step.

* * * * *